(12) United States Patent
Hara

(10) Patent No.: US 10,683,898 B2
(45) Date of Patent: Jun. 16, 2020

(54) CLUTCH DEVICE, PROCESS CARTRIDGE AND IMAGE FORMING APPARATUS

(71) Applicant: CANON KABUSHIKI KAISHA, Tokyo (JP)

(72) Inventor: Seiji Hara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 15/838,940

(22) Filed: Dec. 12, 2017

(65) Prior Publication Data

US 2018/0180106 A1     Jun. 28, 2018

(30) Foreign Application Priority Data

Dec. 26, 2016  (JP) ................ 2016-250693

(51) Int. Cl.
*F16D 11/04* (2006.01)
*G03G 21/18* (2006.01)
(Continued)

(52) U.S. Cl.
CPC ............ *F16D 11/04* (2013.01); *F16D 27/118* (2013.01); *F16D 27/14* (2013.01); *G03G 15/0868* (2013.01); *G03G 21/1647* (2013.01); *G03G 21/1864* (2013.01); *B65H 2403/722* (2013.01); *B65H 2513/412* (2013.01);
(Continued)

(58) Field of Classification Search
CPC .......... G03G 15/0868; G03G 15/0194; G03G 15/0189; G03G 21/1864; G03G 21/1647; G03G 21/186; G03G 21/1857; G03G 2221/1684; G03G 2221/1657; F16D 27/118; F16D 27/108; F16D 27/14; F16D 11/04; F16D 2011/006; F16D 2011/008
See application file for complete search history.

(56) References Cited

U.S. PATENT DOCUMENTS 7,297,036 B1 * 11/2007 Weronke ............... B63H 23/30
                                                         192/21
2015/0147093 A1   5/2015 Mori et al.
2015/0212456 A1 * 7/2015 Imaizumi ........... G03G 21/1647
                                                         74/665 G

FOREIGN PATENT DOCUMENTS

JP    H11-075639 A    3/1999
JP    2003-208024 A   7/2003
(Continued)

*Primary Examiner* — Jacob S. Scott
*Assistant Examiner* — Lori Wu
(74) *Attorney, Agent, or Firm* — Venable LLP

(57) ABSTRACT

A clutch device includes a drive transmitting shaft; a driving-side engaging member; and a driven-side engaging member. A driving force is transmitted from the driving-side engaging member to the driven-side engaging member. The driving-side engaging member has a driving-side clutch tooth, and the driven-side engaging member has a driven-side clutch tooth capable of being engaged with and released from the driving-side clutch tooth. The driving-side clutch tooth and the driven-side clutch tooth have drive transmitting surfaces inclined so as to axially attracting each other in engagement with each other. At least one of the driving-side clutch tooth and the driven-side clutch tooth has a functional surface on a free end side relative to the drive transmitting surface with respect to the engaging direction. The functional surface is inclined so as to axially separating from a surface of the other clutch tooth in engagement therewith.

5 Claims, 17 Drawing Sheets

(51) Int. Cl.
*F16D 27/14* (2006.01)
*F16D 27/118* (2006.01)
*G03G 15/08* (2006.01)
*G03G 21/16* (2006.01)
*G03G 15/01* (2006.01)

(52) U.S. Cl.
CPC ..... *G03G 15/0189* (2013.01); *G03G 15/0194* (2013.01); *G03G 2221/1657* (2013.01); *G03G 2221/1684* (2013.01)

(56) References Cited

FOREIGN PATENT DOCUMENTS

| | | |
|---|---|---|
| JP | 2010-107008 A | 5/2010 |
| JP | 2011-132988 A | 7/2011 |

\* cited by examiner (a)

(b)

(a)

(b)

(a)

(b)

CLUTCH DEVICE, PROCESS CARTRIDGE AND IMAGE FORMING APPARATUS

This application claims the benefit of Japanese Patent Application No. 2016-250693, filed on Dec. 26, 2016, which is hereby incorporated by reference herein in its entirety.

FIELD OF THE INVENTION AND RELATED ART

The present invention relates to a clutch device capable of switching transmission and release of the transmit of a driving force and relates to a process cartridge and an image forming apparatus which include the clutch device.

Conventionally, when the driving force is transmitted from a driving source to a driven portion (follower portion), in order to control ON/OFF of transmission of the driving force, various clutch device such as an electromagnetic clutch and a spring clutch have been used. However, in many cases, these clutch devices are expensive and a shape thereof is limited. On the other hand, a clutch device having a mechanical structure is relatively inexpensive and does not generate improper operation such as a slip. For that reason, for example, for the purpose of switching the drive transmission of the image forming apparatus or the like, the clutch device having the mechanical structure has been used in many cases.

As the mechanical clutch device, for example, there is a clutch device disclosed in Japanese Laid-Open Patent Application (JP-A) 2003-208024. This is an example in which a mechanical clutch is employed in an in-linen color electrophotographic apparatus. In the in-line color electrophotographic apparatus, a method of driving an electophotographic photosensitive member and a developing device by the same (single) motor in order to suppress a cost is employed. In JP-A 2003-208024, in addition to such a constitution, in order to solve a problem of a waste of a developer, a mechanical clutch device for controlling rotation and a stop of the rotation in drive of the developing device is employed.

However, in the above-described prior art, there was a problem described below. In JP-A 2003-208024, clutch teeth of a driving-side engaging member and a driven-side engaging member are twisted so as to bite each other when the driving-side engaging member and the driven-side engaging member are engaged with each other. In this constitution, when the drive is interrupted, i.e., when the driving-side engaging member and the driven-side engaging member are spaced from each other, in addition to a force with respect to a rotational direction, a large force with respect to a longitudinal axial direction is exerted on a tooth top of a clutch tooth. By this force, the tooth top is deformed, so that impact noise due to distortion of the tooth top generated simultaneously with spacing between the driving-side engaging member and the driven-side engaging member in some cases.

In order to suppress the impact noise, it would be considered that the deformation of the tooth top is suppressed by providing the tooth top of the clutch tooth with an R shape. However, when the tooth top of the clutch tooth is simply provided with the R shape, when the drive is turned on, i.e., when the driving-side engaging member and the driven-side engaging member are engaged with each other, the R-shaped tooth top portion of the clutch tooth is locked, so that improper engagement generates between the driving-side engaging member and the driven-side engaging member.

When the improper engagement generates during image formation, tooth skipping (jumping) of the clutch tooth generates due to a load fluctuation of the developing device, and rotation non-uniformity of the developing device due to the tooth skipping generates, so that a formed image is disturbed.

SUMMARY OF THE INVENTION

The present invention has been accomplished in view of the above-described problems. A principal object of the present invention is to provide a clutch device capable of suppressing impact noise during spacing of a clutch and capable of preventing improper engagement during engagement of the clutch with a simple constitution.

According to an aspect of the present invention, there is provided a clutch device comprising: a drive transmitting shaft; a driving-side engaging member provided on the drive transmitting shaft; and a driven-side engaging member provided on the drive transmitting shaft, wherein a driving force is transmitted from the driving-side engaging member to the driven-side engaging member by engagement therebetween, and transmission of the driving force is released by release of the engagement, wherein the driving-side engaging member has a driving-side clutch tooth projecting in an engaging direction, wherein the driven-side engaging member has a driven-side clutch tooth projecting in the engaging direction and capable of being engaged with and released from the driving-side clutch tooth, wherein the driven-side engaging member has a driven-side clutch tooth projecting in the engaging direction and capable of being engaged with and released from said driving-side clutch tooth, wherein the driving-side clutch tooth and the driven-side clutch tooth have drive transmitting surfaces inclined so as to axially attracting each other in engagement with each other, and wherein at least one of the driving-side clutch tooth and the driven-side clutch tooth has a functional surface on a free end side relative to the drive transmitting surface with respect to the engaging direction, the functional surface being inclined so as to axially separating from a surface of the other clutch tooth in engagement therewith.

Further features of the present invention will become apparent from the following description of exemplary embodiments with reference to the attached drawings.

Figure 5:
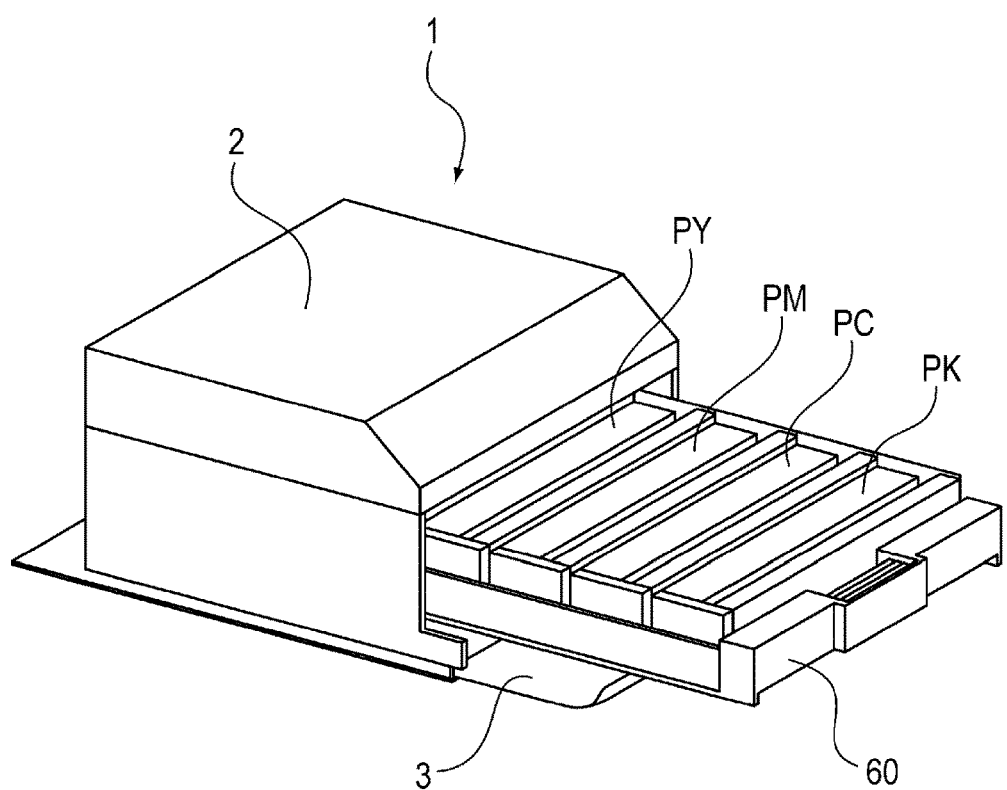
Figure 5:
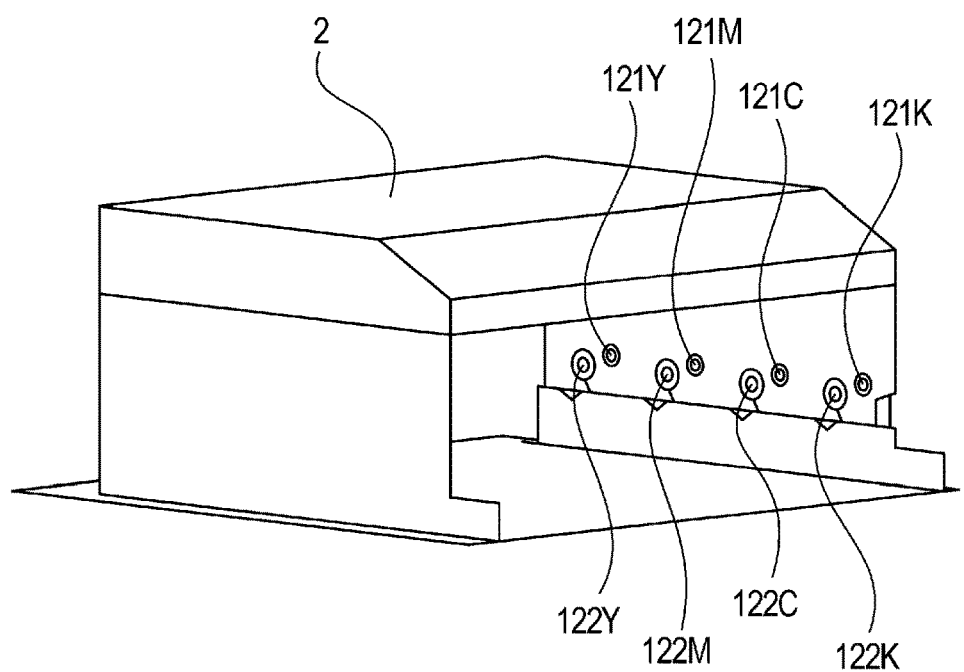

Parts (a) and (b) of FIG. 5 are perspective views showing an image forming apparatus main assembly and the process cartridge.

Figure 6:
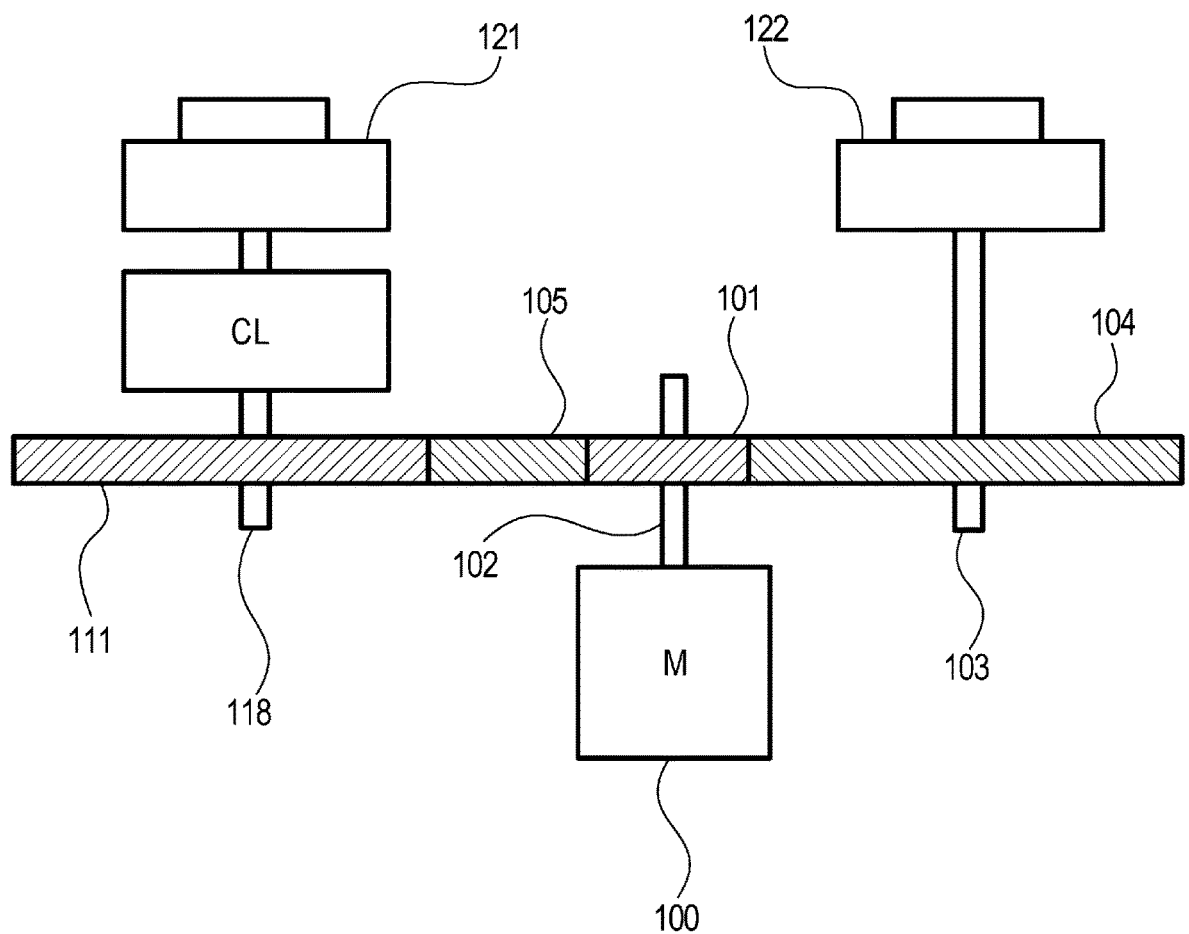

FIG. 6 is a schematic view showing a drive constitution of a photosensitive drum and a developing roller.

Figure 7:
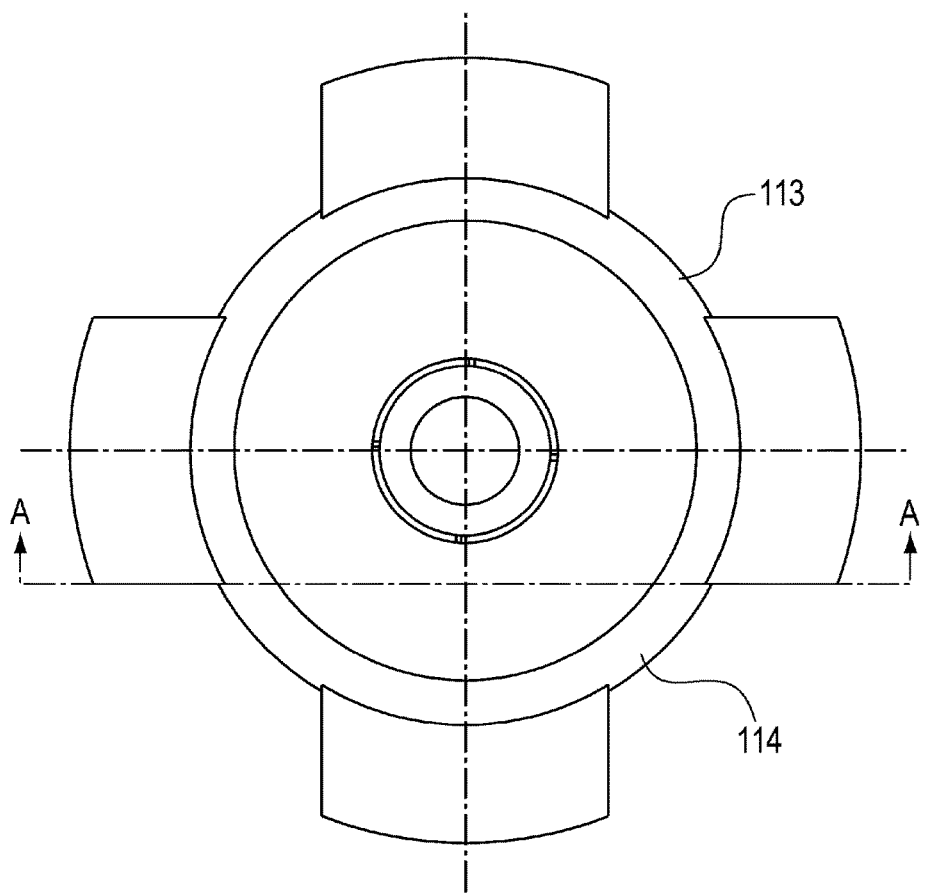
Figure 7:
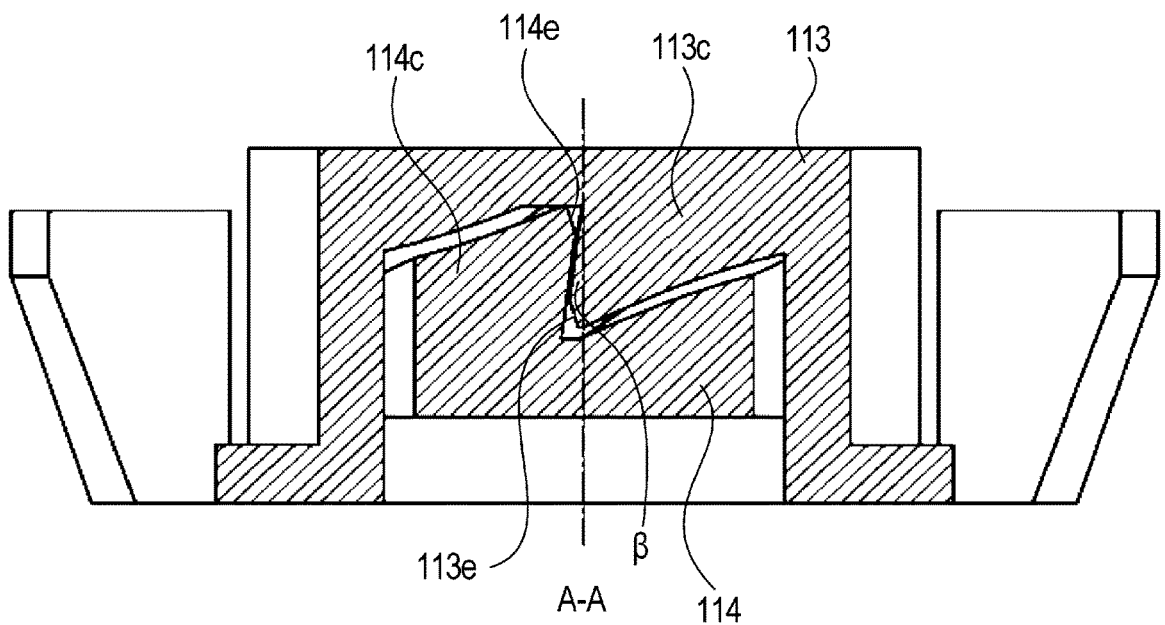

Parts (a) and (b) of FIG. 7 are schematic views for illustrating a structure of functional surfaces of a clutch.

Figure 8:
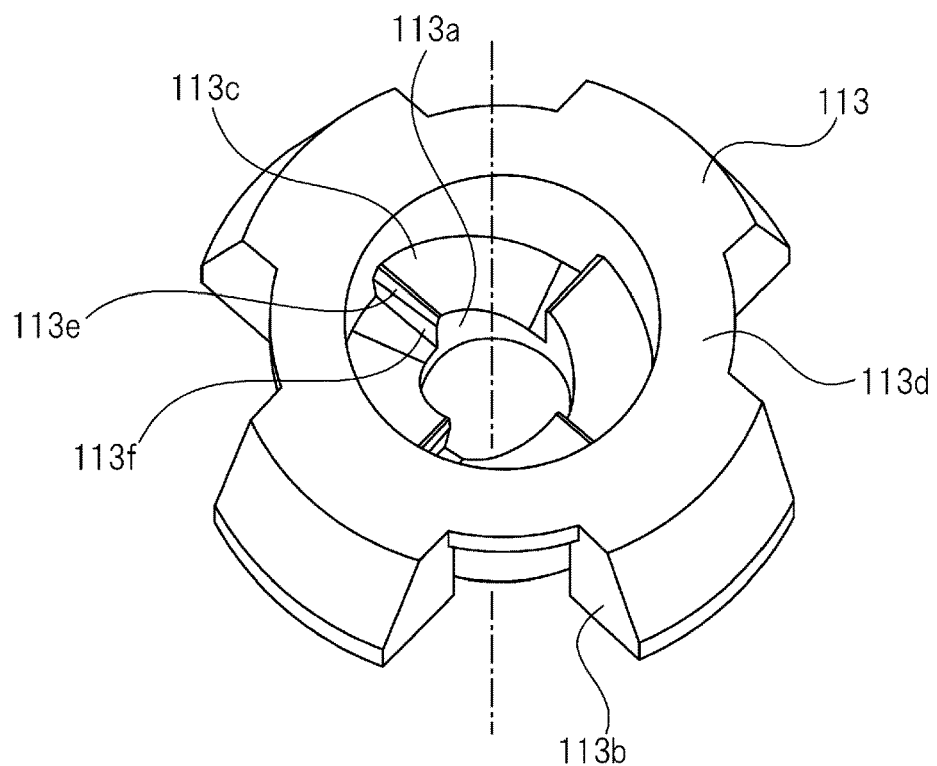
Figure 8:
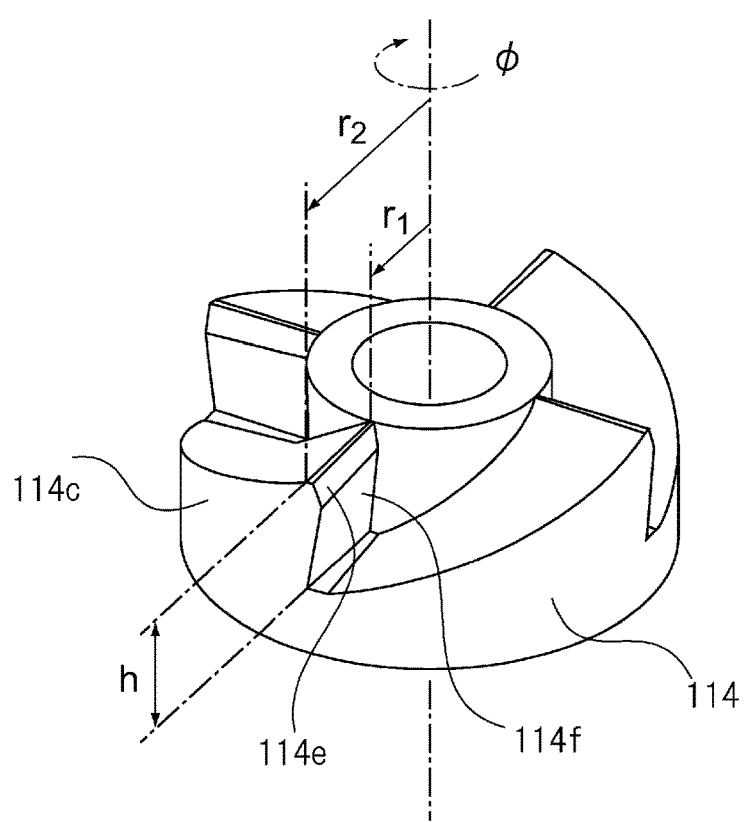

Parts (a) and (b) of FIG. 8 are schematic views for illustrating the structure of the functional surfaces of the clutch.

Figure 9:
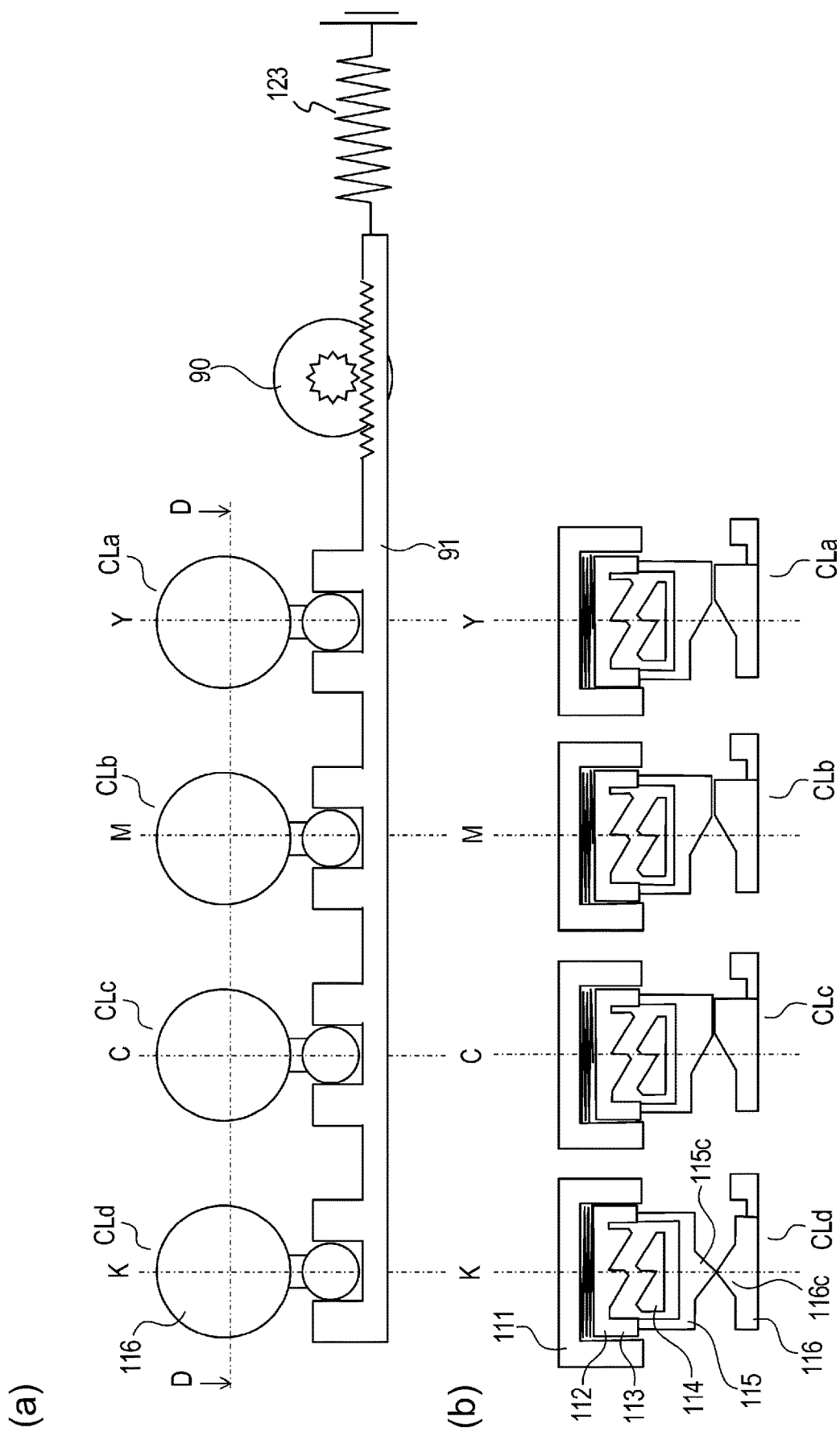

Parts (a) and (b) of FIG. 9 are schematic views showing a state of the clutch at a home position.

Figure 10:
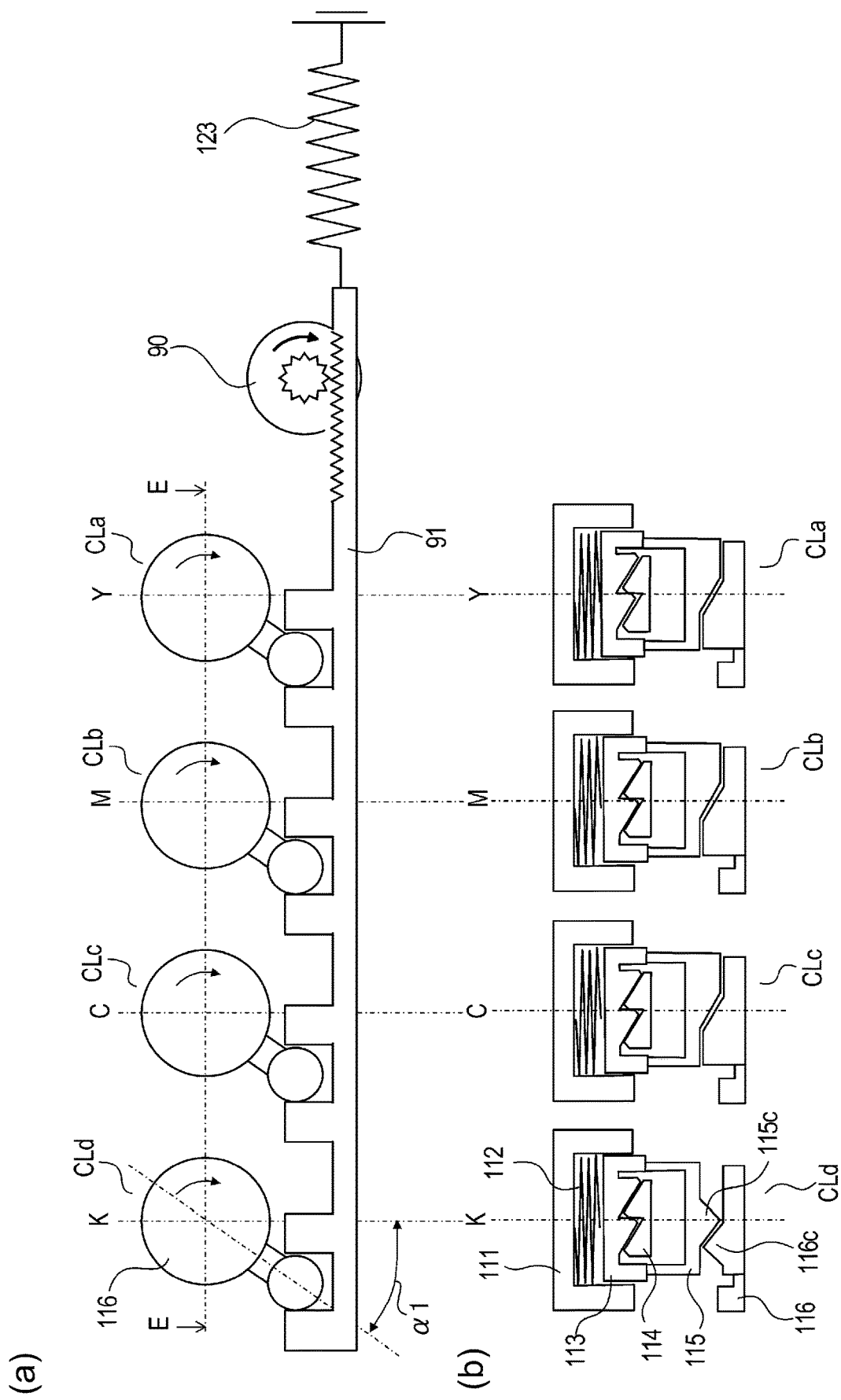

Parts (a) and (b) of FIG. 10 are schematic views showing a state of the clutch during full-color recording.

Figure 11:
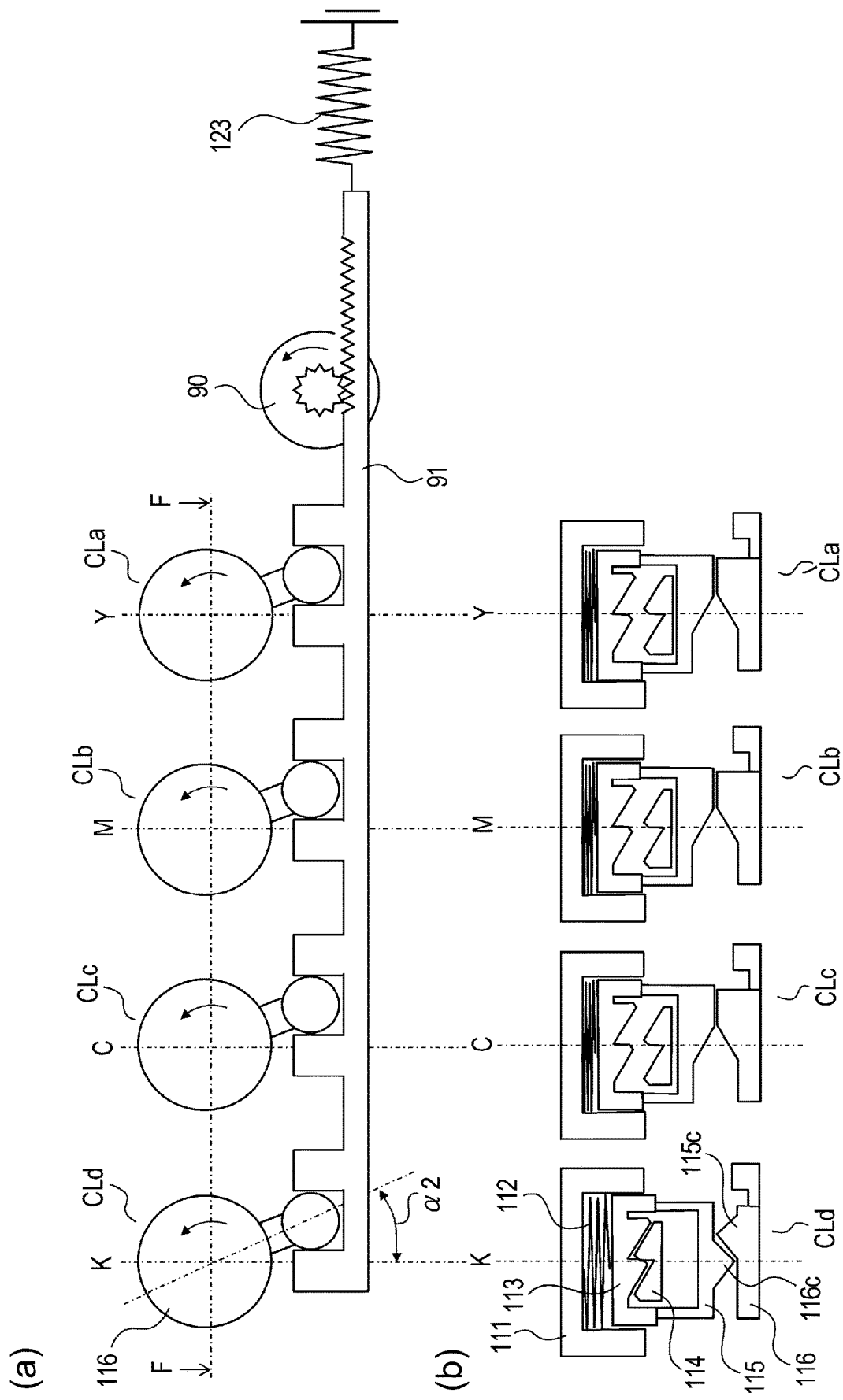

Parts (a) and (b) of FIG. 11 are schematic views showing a state of the clutch during monochromatic recording.

Figure 12:
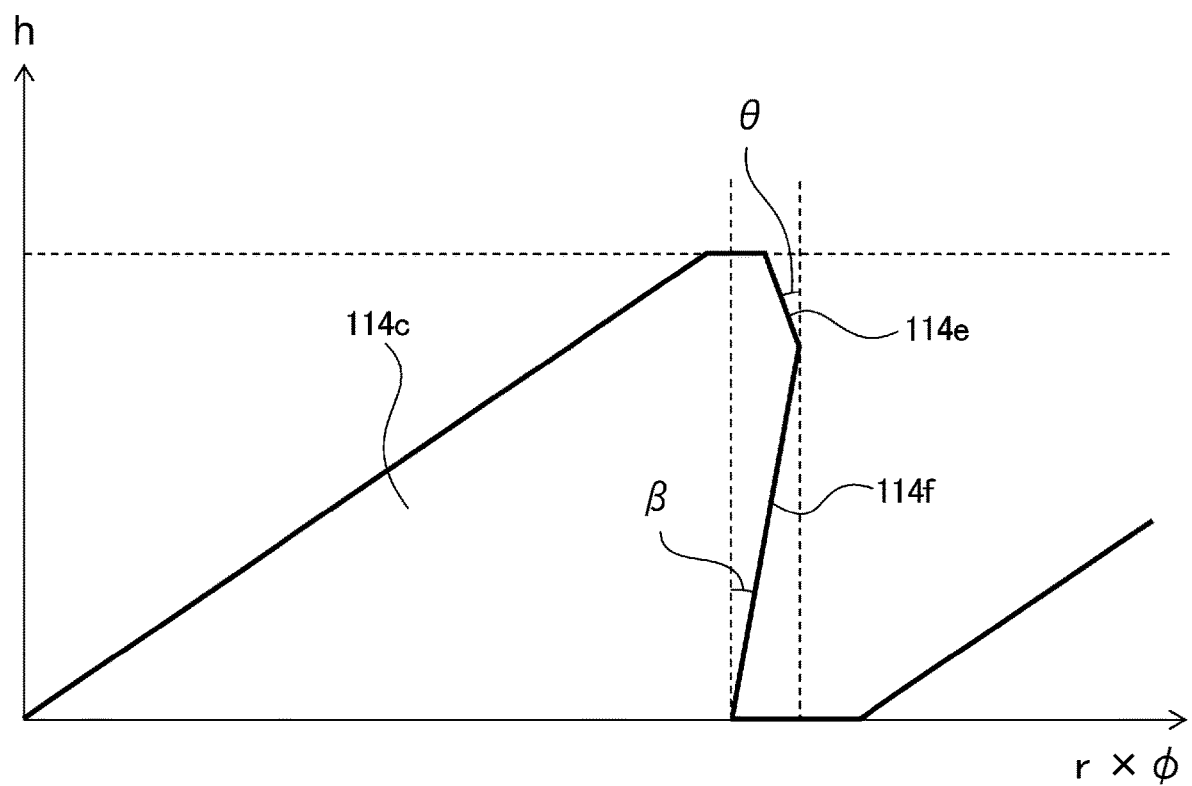

FIG. 12 is a development of a helically processed portion of the clutch.

Figure 13:
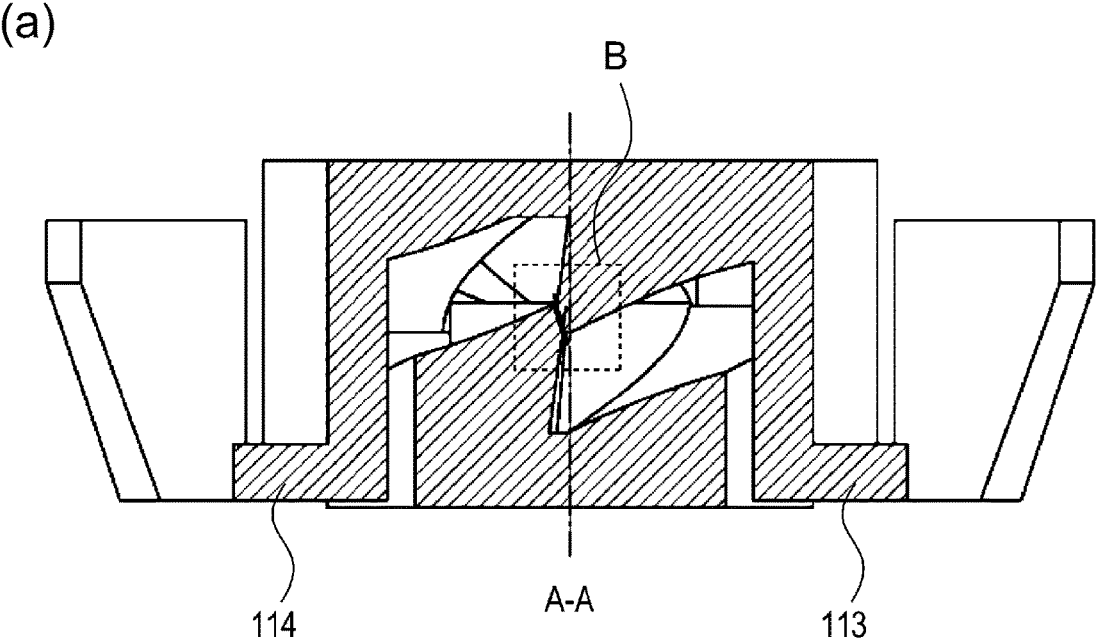
Figure 13:
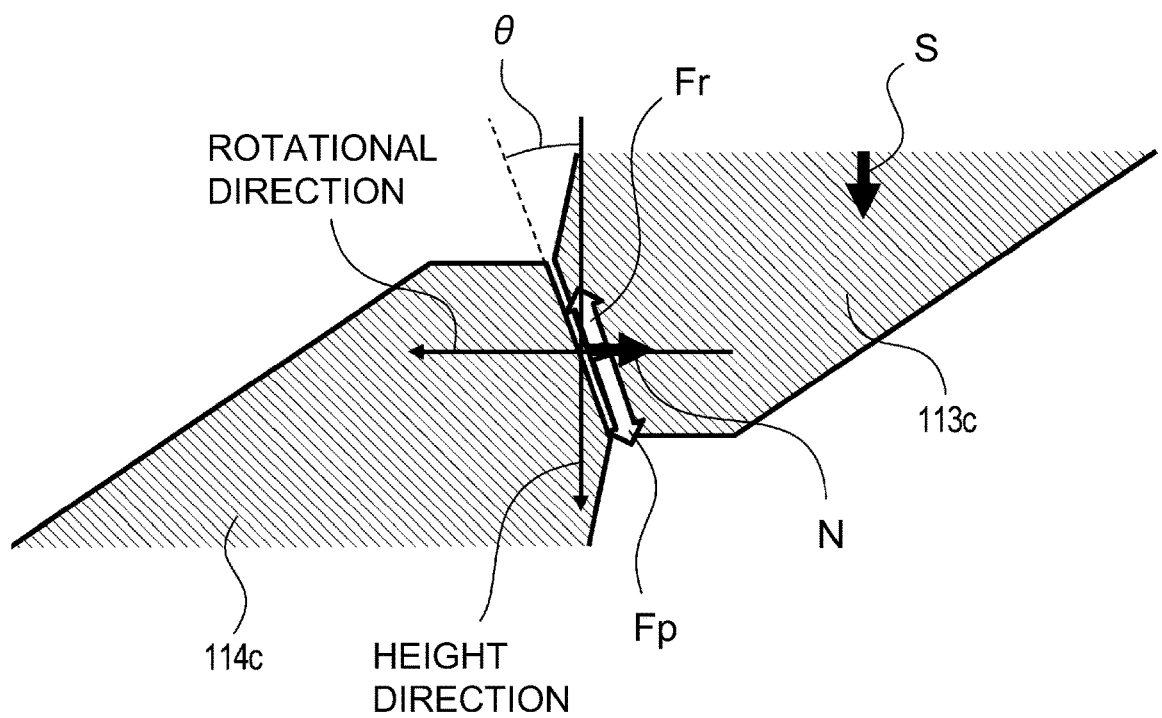

Parts (a) and (b) of FIG. 13 are schematic views showing a state of tooth top abutment of the clutch and a dynamic model in the state, respectively.

Figure 14:
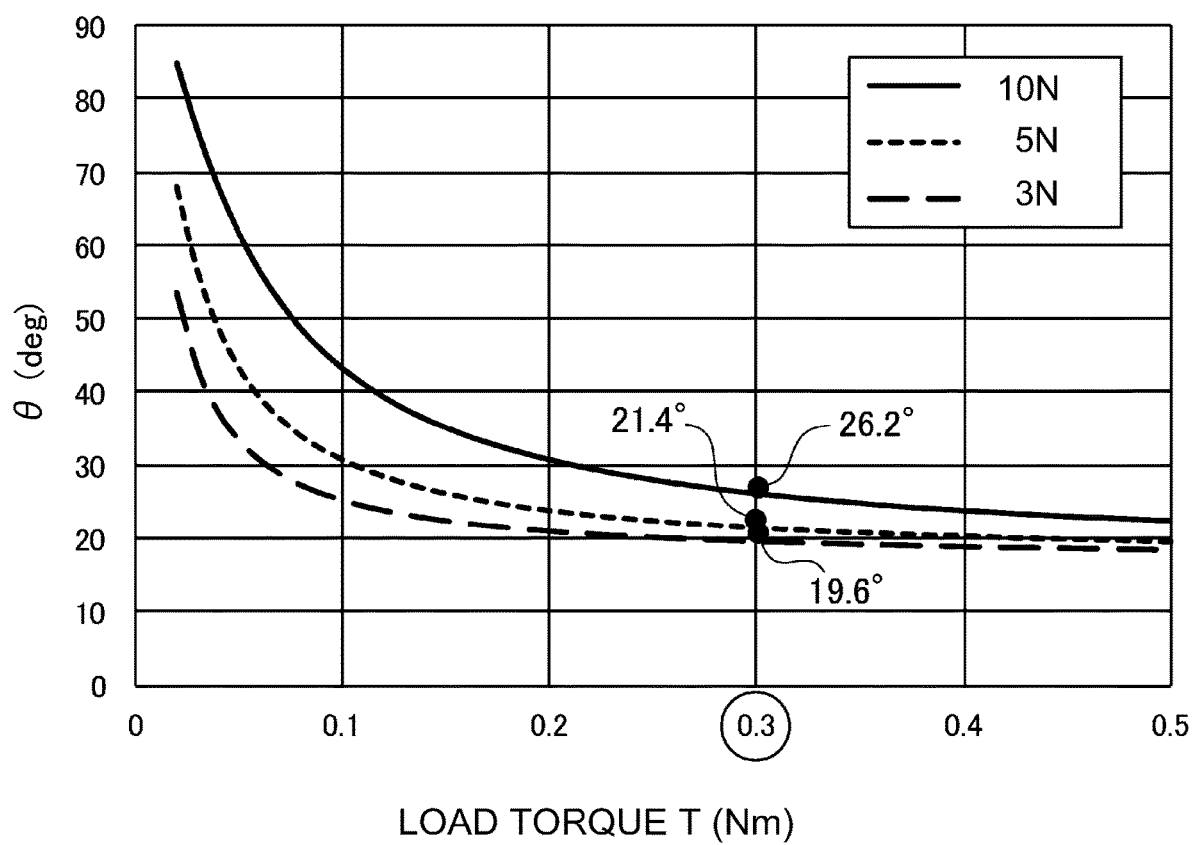

FIG. 14 is a graph showing a relationship between a functional surface angle and a load torque.

Figure 15:
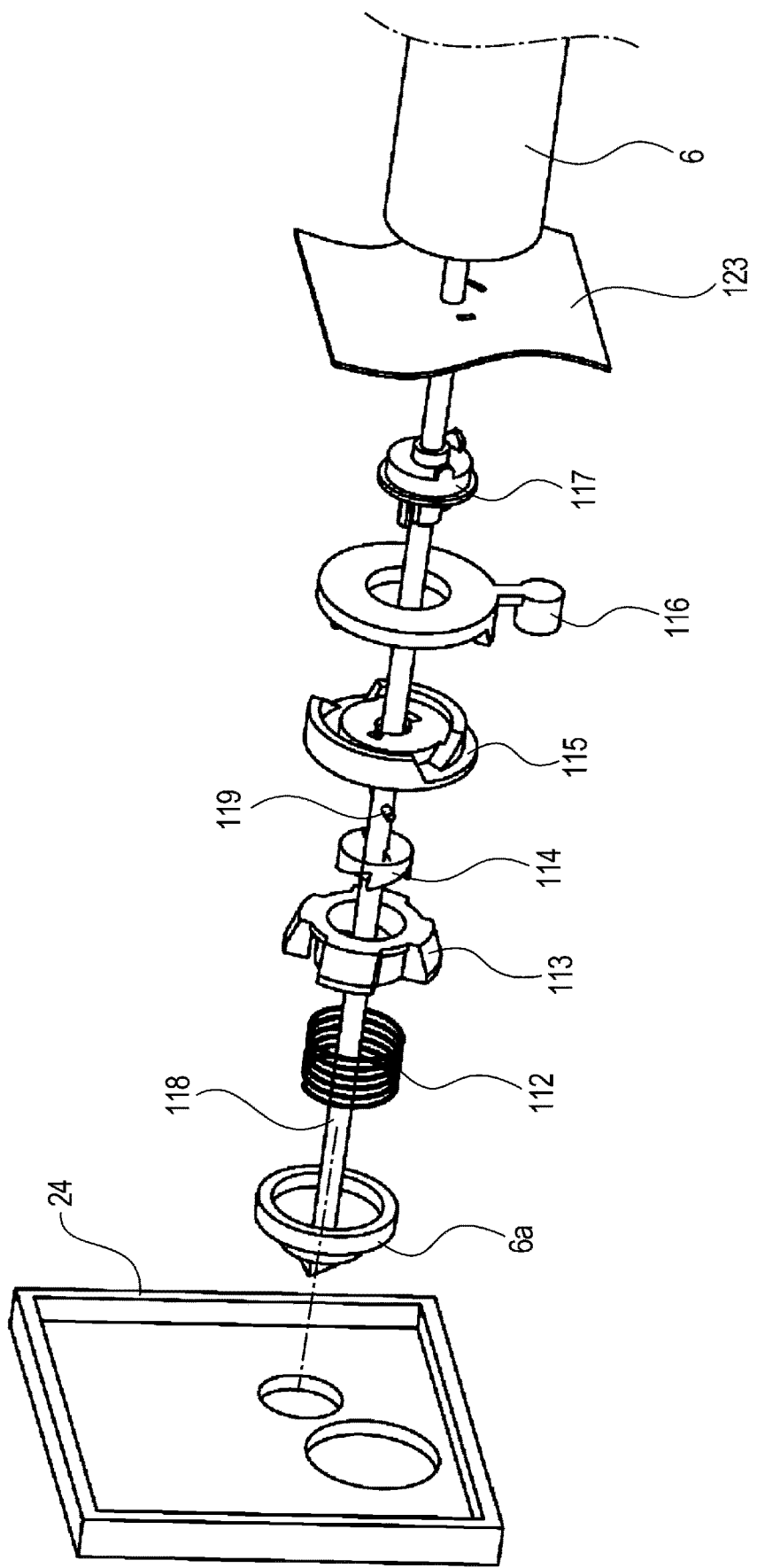

FIG. 15 is a perspective view of the clutch mounted in the process cartridge.

Figure 16:
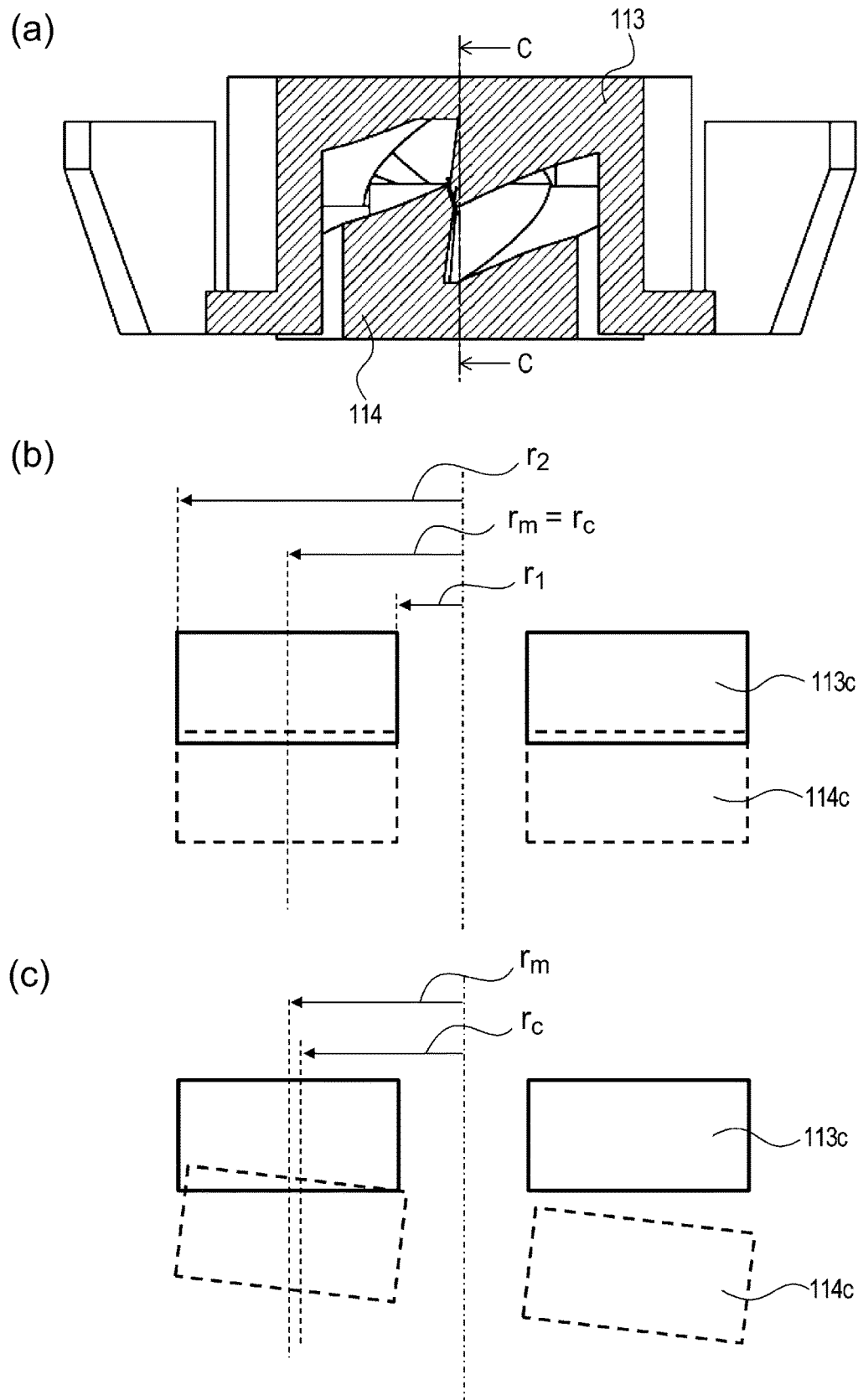

Parts (a), (b) and (c) of FIG. 16 are sectional views for illustrating a state in which a clutch is inclined and engaged with respect to an axial direction.

Figure 17:
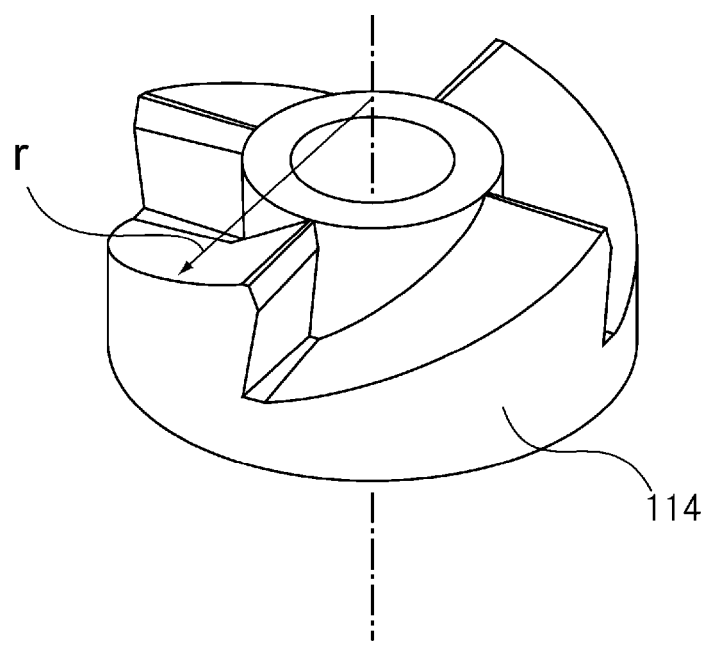

FIG. 17 is a perspective view of a driven-side engaging member having a functional surface angle changed with a distance of a clutch tooth with respect to a radial direction.

Figure 18:
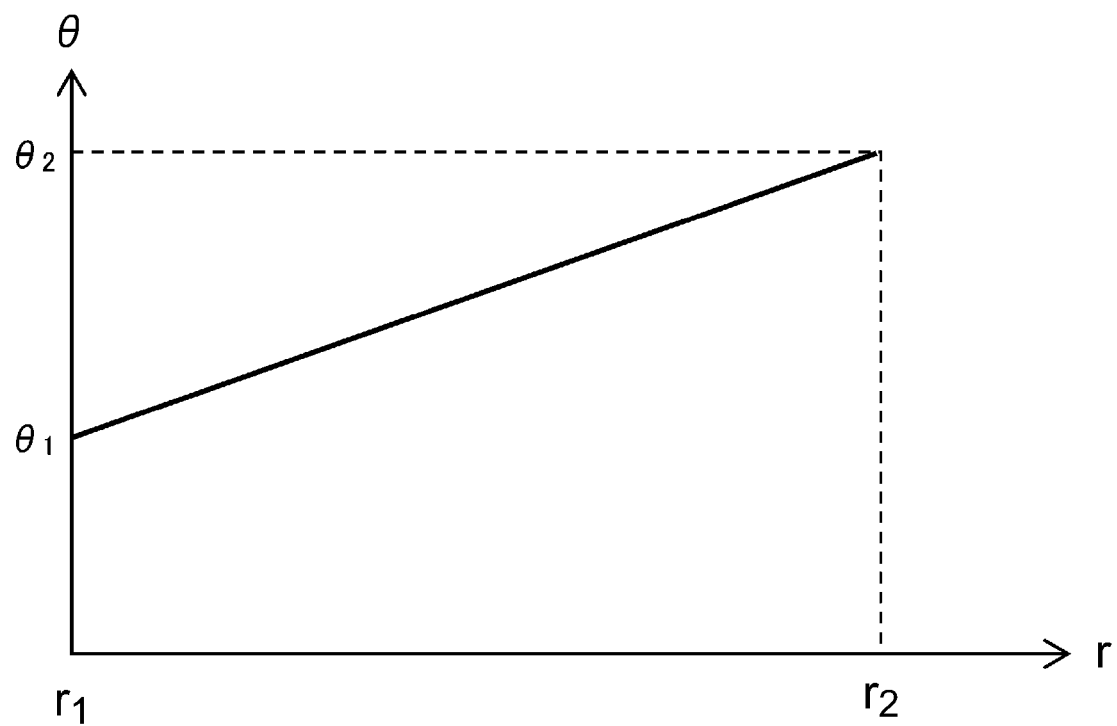

FIG. 18 is a graph showing a relationship between the functional surface angle and the distance of the clutch tooth with respect to the radial direction.

DESCRIPTION OF EMBODIMENTS

Hereinbelow, embodiments of a clutch device according to the present invention will be specifically described using an image forming apparatus including the clutch device, as an example.

First Embodiment

In the following embodiments of the present invention, a full-color image forming apparatus to which four process cartridges are detachably mountable is described as an example.

Incidentally, the number of the process cartridges to be mounted in the image forming apparatus is not limited to four but may appropriately be set as desired.

For example, in the case of an image forming apparatus for forming a monochromatic image, the number of the process cartridges to be mounted in the image forming apparatus is one. Further, in the following embodiments, as an example of the image forming apparatus, a printer is exemplified.

[Image Forming Apparatus]

Figure 2:
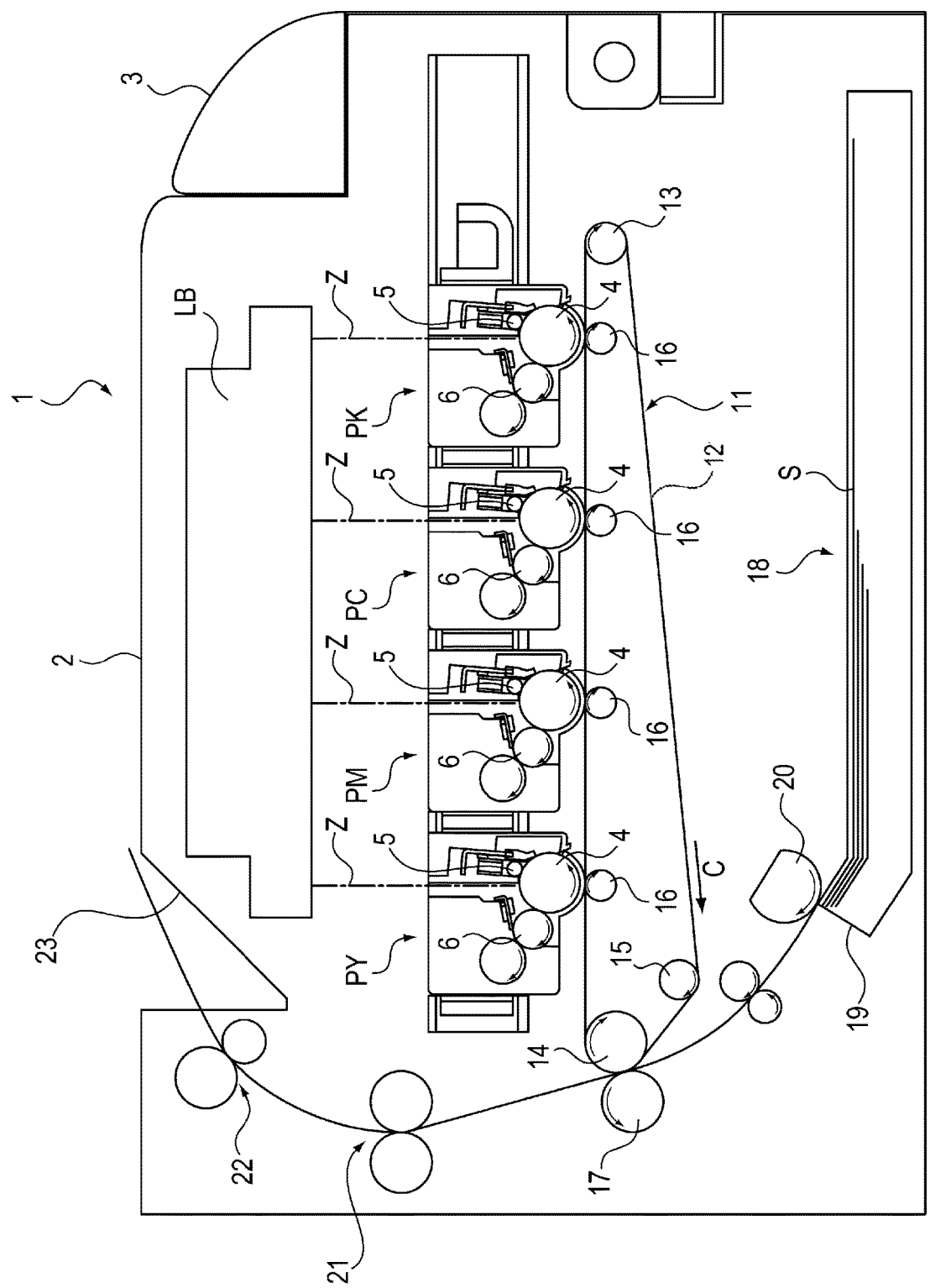
FIG. 2 is a sectional view of an electrophotographic image forming apparatus and a process cartridge.

FIG. 2 is a schematic sectional view of the image forming apparatus in this embodiment.

Figure 3:
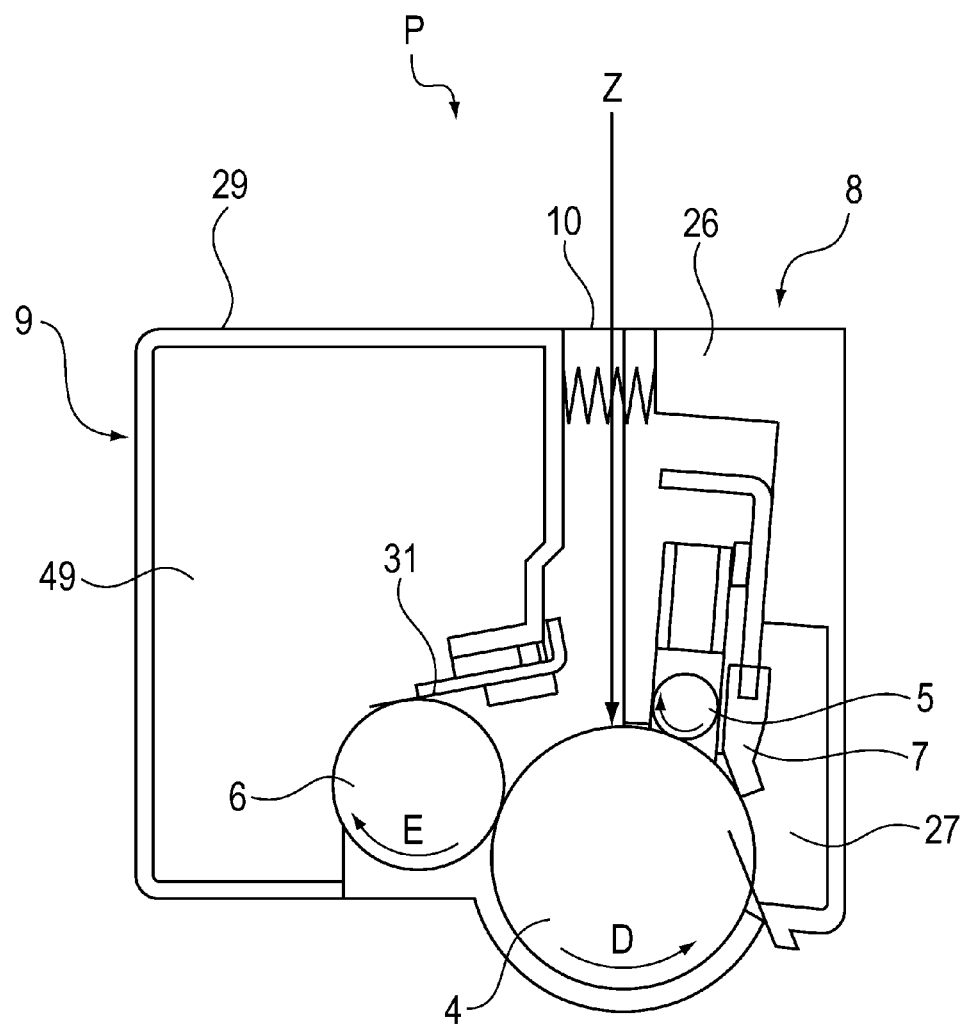
FIG. 3 is a sectional view of the process cartridge.
Figure 4:
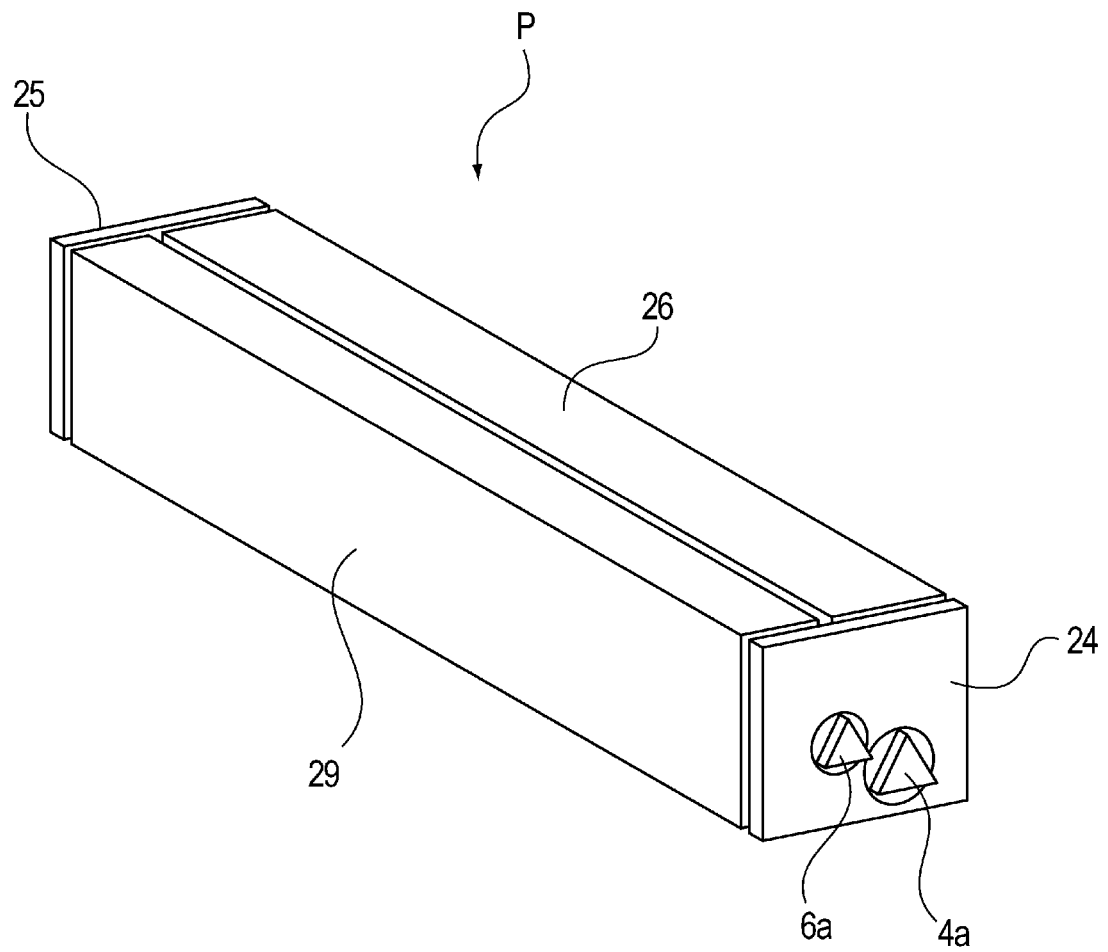
FIG. 4 is a perspective view of the process cartridge.

FIG. 3 is a sectional view of a process cartridge P in this embodiment. FIG. 4 is a perspective view of the process cartridge P in this embodiment as seen from a driving side. Part (a) of FIG. 5 is a perspective view of the image forming apparatus in this embodiment, and part (b) of FIG. 5 is a perspective view of the image forming apparatus in a state in which the process cartridges P are demounted from the image forming apparatus.

As shown in FIG. 2, the image forming apparatus 1 is a four color-based full-color laser printer using an electrophotographic image forming process and forms a color image on a recording material S. The image forming apparatus 1 is of a process cartridge type in which the process cartridges are detachably mounted in an electrophotographic image forming apparatus main assembly 2 and a color image is formed on the recording material S.

Here, with respect to the image forming apparatus 1, the side (surface) on which a front door 3 is provided is referred to as a front side (surface), and a side (surface) opposite to the front side (surface) is referred to as a rear side (surface). Further, a right side when the image forming apparatus 1 is viewed from the front side is referred to as a driving side, and a left side is referred to as a non-driving side.

In the image forming apparatus main assembly 2, four process cartridges P consisting of a first process cartridge PY (yellow), a second process cartridge PM (magenta), a third process cartridge PC (cyan) and a fourth process cartridge PK (black) are provided and arranged in a horizontal direction. The respective first to fourth process cartridges P constituting an image forming portion have the same electrophotographic image forming process mechanism but contain developers different in color from one another. To the first to fourth process cartridges P, a rotational driving force is transmitted from a drive output portion of the image forming apparatus main assembly 2.

Further, to the first to fourth cartridges P, bias voltages (charging bias, developing bias and the like) are supplied from the image forming apparatus main assembly 2 (not shown).

As shown in FIG. 2, each of the first to fourth process cartridges P includes a photosensitive drum unit 8. The photosensitive drum unit 8 includes a photosensitive drum 4 which is an image bearing member and includes a charging means and a cleaning means which are used as process means actable on the photosensitive drum 4.

Further, each of the first to fourth process cartridges P includes a developing unit 9 including a developing means for developing an electrostatic latent image on the drum 4.

In the first to fourth process cartridges P, the developers of yellow (Y), magenta (M), cyan (C), and black (K) are accommodated, and the toner images of the respective colors are formed on the drums 4.

Above the first to fourth process cartridges P, a laser scanner unit LB as an exposure means is provided. This laser scanner unit LB outputs laser light Z correspondingly to image information. Then, the laser light Z passes through an exposure window portion 10 of each process cartridge P, so that the surface of the drum 4 is subjected to scanning exposure to the laser light Z.

Under the first to fourth process cartridges P, an intermediary transfer belt unit 11 as a transfer member is provided. This intermediary transfer belt unit 11 includes a driving roller 13 and tension rollers 14 and 15, and includes a flexible transfer belt 12 extended and stretched by the rollers.

The drum 4 of each of the first to fourth process cartridges P is contacted to an upper surface of the transfer belt 12 at its lower surface. A resultant contact portion is a primary transfer portion. Inside the transfer belt 12, primary transfer rollers 16 are disposed opposed to the associated photosensitive drums 4.

Further, a secondary transfer roller 17 is provided at a position opposing the tension roller 14 via the transfer belt 12. A resultant contact portion between the transfer belt 12 and the secondary transfer roller 17 is a secondary transfer portion.

Below the intermediary transfer belt unit 11, a feeding unit 18 is disposed. This feeding unit 18 includes a sheet feeding tray 19 in which sheets of the recording material S are stacked and accommodated, and includes a feeding roller 20.

In an upper left side of the apparatus main assembly 2 in FIG. 2, a fixing unit 21 and a discharging unit 22 are provided. At an upper surface of the apparatus main assembly 2, a sheet discharge tray 23 is disposed.

On the recording material S on which the developer images are transferred, the developer images are fixed by a fixing means provided in the fixing unit 21, and then the recording material S is discharged onto the discharge tray 23.

The process cartridges P are constituted so as to be detachably mountable to the apparatus main assembly 2 with a process cartridge tray 60 capable of being pulled out. Part (a) of FIG. 5 shows a state in which the process cartridge tray 60 and the process cartridges P are pulled out from the apparatus main assembly 2.

[Image Forming Operation]

An image forming operation for forming a full-color image is as follows. The drums 4 of the first to fourth cartridges P are rotationally driven at a predetermined speed (in an arrow D direction in FIG. 3 and in the counterclockwise direction in FIG. 2).

The transfer belt 12 is also rotationally driven in the same direction (in an arrow C direction in FIG. 2) as the rotational direction of the drums 4 (at their contact portions) at a speed corresponding to the speed of the drums 4.

The laser scanner unit LB is also driven. In synchronism with the drive of the laser scanner unit LB, the surface of the photosensitive drum 4 of each cartridge P is uniformly charged to a predetermined polarity and a predetermined potential by the charging roller 5. The laser scanner unit LB scans and exposes the surface of each drum 4 with the laser light Z depending on an image signal for an associated color.

As a result, the electrostatic latent image depending on the image signal for the associated color is formed on the surface of the associated drum 4. The thus formed electrostatic latent image is developed by the developing roller 6 which is rotationally driven (in an arrow E direction in FIG. 3 and in the clockwise direction in FIG. 2) at a predetermined speed.

By the electrophotographic image forming process operation as described above, on the drum 4 of the first process cartridge PY, a yellow developer image corresponding to a yellow component for the full-color image is formed. Then, the developer image is primary-transferred onto the transfer belt 12. Similarly, the respective developer images of magenta, cyan and black are formed and primary-transferred superposedly onto the transfer belt 12.

In this way, unfixed developer images of yellow, magenta, cyan and black for the four color-based full-color image are formed on the transfer belt 12.

On the other hand, at predetermined control timing, sheets of the recording material S are separated and fed one by one. The recording material S is introduced into the secondary transfer portion which is the contact portion between the secondary transfer roller 17 and the transfer belt 12 with predetermined control timing.

As a result, in a process in which the recording material S is conveyed to the secondary transfer portion, the four color toner images superposed on the transfer belt 12 are successively transferred altogether onto the surface of the recording material S.

[General Structure of Process Cartridge]

In this embodiment, the first to fourth process cartridges P have the same electrophotographic image forming process and are different from each other in color and fulling amount of the developers.

Each of the process cartridges P includes the drum 4 as a photosensitive member and process means actable on the drum 4. The process means include a charging roller 5 as a charging means for electrically charging the drum 4, a developing roller 6 as a developing means for developing the latent image formed on the drum 4, a cleaning blade 7 as a cleaning means for removing a residual developer remaining on the surface of the drum 4, and the like. The process cartridge P is divided into the drum unit 8 and a developing unit 9.

[Drum Unit]

As shown in FIGS. 3 and 4, the drum unit 8 is constituted by the drum 4 as the photosensitive member, the charging roller 5, the cleaning blade 7, a cleaning container 26 as a photosensitive member frame, a residual developer accommodating portion 27 and process cartridge cover members (a driving side process cartridge cover member 24 and a non-driving side process cartridge cover member 25 in FIG. 4).

The drum 4 is rotatably supported by the process cartridge cover members 24 and 25 provided at longitudinal ends of the process cartridge P. Here, an axial direction of the drum 4 is defined as a longitudinal direction.

The process cartridge cover members 24 and 25 are fixed to the cleaning container 26 at both ends of the cleaning container 26 with respect to the longitudinal direction.

Further, as shown in FIG. 4, on one longitudinal end side of the drum 4, a drum coupling 4a for transmitting a driving force to the drum 4 is provided. Part (b) of FIG. 5 is a perspective view of the apparatus main assembly 2, and the process cartridge tray 60 and the process cartridges P are not shown. The drum coupling member 4a of each of the process cartridges P engages with a drum drive output member 122 (122Y, 122M, 122C, 122K) as a main assembly-side drive transmitting member of the apparatus main assembly 2 shown in (b) of FIG. 5, so that the driving force of a driving motor (not shown) of the apparatus main assembly is transmitted to the drum 4.

The charging roller 5 is supported by the cleaning container 26 so as to be rotatable by the rotation of the drum 4 in contact with the drum 4.

The cleaning blade 7 is supported by the cleaning container 26 so as to contact a peripheral surface of the drum 4 at a predetermined pressure.

The transfer residual developer removed from the peripheral surface of the drum 4 by the cleaning blade 7 is accommodated in the residual developer accommodating portion 27 in the cleaning container 26.

The driving side process cartridge cover member 24 and the non-driving side process cartridge cover member 25 are provided with supporting portions (not shown) for rotatably supporting the developing unit 9.

[Developing Unit]

The developing unit 9 is constituted, as shown in FIG. 3, by the developing roller 6, a developing blade 31, the developing (member) frame 29, an unshown bearing member, an unshown developing (member) cover member, and the like. When the process cartridge P is mounted in the apparatus main assembly 2, the developing frame 29 is movable relative to the apparatus main assembly 2.

The developing frame 29 includes a developer accommodating portion 49 for accommodating the developer supplied to the developing roller 6 and the developing blade 31 for regulating a layer thickness of the developer on the peripheral surface of the developing roller 6.

As shown in FIG. 4, at one longitudinal end of the developing roller 6, a developing (roller) coupling member 6a for transmitting the driving force to the developing roller 6 is provided. The developing coupling member 6a of each process cartridge P engages with a developing (roller) drive outputting member 121 (121Y, 121M, 121C, 121K) as a main assembly-side drive transmitting member of the apparatus main assembly 2, so that the driving force of a driving motor (not shown) of the apparatus main assembly 2 is transmitted to the developing roller 6.

[Driving Constitution and Clutch Adaptable Portion]

In the image forming apparatus such as the laser beam printer, in order to suppress a cost of the motors, in many cases, a constitution in which the photosensitive drum and the developing device are driven by a single motor is employed. In the case where the photosensitive drum and the developing device are driven by the single motor, when cleaning of the photosensitive drum is carried out in, e.g., a preparatory operation before the image formation, in order to suppress waste of the developer, there is a need that the drive of the developing device is stopped and only the photosensitive drum is driven, and for this purpose, a clutch device is used. A constitution of the clutch device for that purpose will be described.

A drive constitution of the drum 4 or the developing roller 6 will be described with reference to FIG. 6. FIG. 6 is a schematic view of a main assembly driving portion as seen from above the main assembly driving portion, and the process cartridge P is not shown.

As shown in FIG. 6, the driving force of a motor 100 is distributed, and a drum drive outputting member 122 and the driving drive outputting member 121 are driven. That is, when the motor 100 is rotated, a pinion gear 101 connected with the motor 100 via a motor shaft 102 is rotated. The pinion gear 101 is engaged with an idler gear 105 and a drum input gear 104, and when the pinion gear 101 is rotated, the idler gear 105 and the drum input gear 104 are rotated.

The drum input gear 104 is connected with the drum drive outputting member 122 via a drum driving shaft 103, at the same time when the drum input gear 104 is rotated, the drum drive outputting member 122 is rotated. The drum drive outputting member 122 is connected with the drum coupling member 4a of an unshown process cartridge P in FIG. 6, so that the driving force is transmitted from the drum drive outputting member 122 to the drum 4 via the drum coupling member 4a.

The idler gear 105 is connected with the developing input gear 111, and when the idler gear 105 is rotated, the developing input gear 111 is rotated. The developing input gear 111 is connected with the developing drive outputting member 121 via a drive transmitting shaft 118 and a clutch CL. The driving force inputted from the motor 100 to the developing input gear 111 is subjected to ON/OFF switching of drive transmission with the clutch CL, and depending on an operation of this clutch CL, rotation and a stop of the rotation of the developing drive outputting member 121 is determined. The developing drive outputting member 121 is connected with the developing coupling member 6a of the unshown process cartridge P (in FIG. 6), so that ON/OFF of the drive of the developing coupling member 6a is controlled.

[Clutch]

A constitution of the clutch CL will be described with reference to FIGS. 1, 7 and 8.

Figure 1:
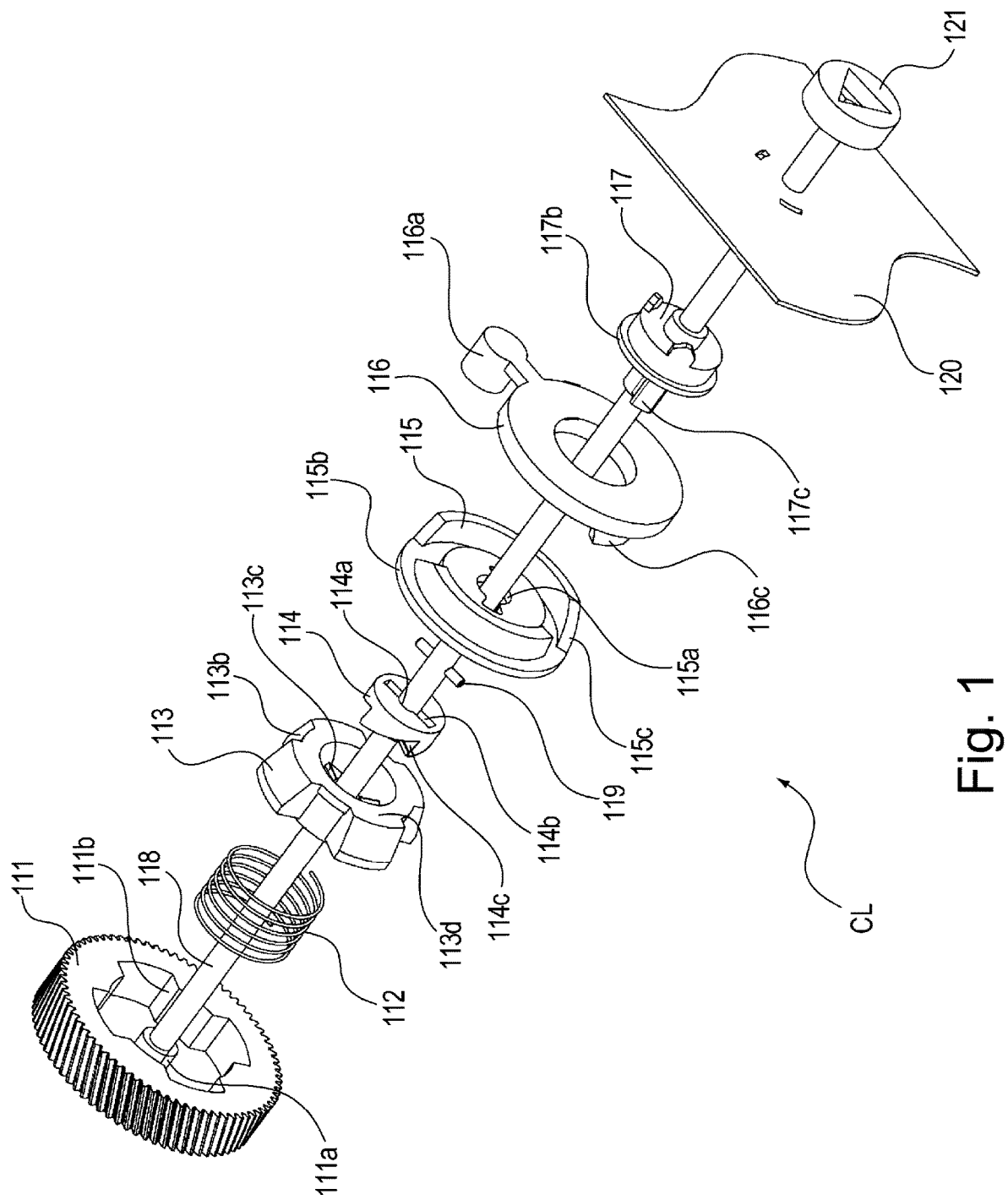
FIG. 1 is a perspective view of a clutch device according to an embodiment of the present invention.

FIG. 1 is a perspective view of a general structure of the clutch CL in this embodiment. Part (a) of FIG. 7 is a schematic view showing a state, as seen from the driven-side engaging member 114, in which the driving-side engaging member 113 and the driven-side engaging member 114 engage with each other, and part (b) of FIG. 7 is an A-A sectional view of (a) of FIG. 7. Part (b) of FIG. 8 is a perspective view of the driving-side engaging member 113, and part (b) of FIG. 8 is a perspective view of the driven-side engaging member 114.

As shown in FIG. 1, the developing input gear 111 is mounted rotatably relative to the driven side drive transmitting shaft 118 by an unshown fixing member so that a position thereof with respect to the axial direction is determined. An inside portion of the developing input gear 111 is largely lightened to form a hollow portion, so that an inner peripheral surface of a sliding boss 111a in the neighborhood of a central portion constitutes a positioning and slidable surface relative to the drive transmitting shaft 118, and an outer peripheral surface of the sliding boss 111a constitutes a positioning and slidable surface relative to the driving-side engaging member 113. Similarly, in the neighborhood of an outer peripheral portion on the inside of the developing input gear 111, four detents 111b and constitute detent portions of the driving-side engaging member 113.

As shown in part (a) of FIG. 8, the driving-side engaging member 113 is provided with an inner peripheral surface 113a. The inner peripheral surface 113a is engaged with and supported by the sliding boss 111a of the developing input gear 111, and at the same time, detents 113b provided at an outer peripheral surface of the driving-side engaging member 113 are engaged with the detents 111b of the developing input gear 111, so that the driving-side engaging member 113 is integrally rotatable with the developing input gear 111. This driving-side engaging member 113 is movable in the axial direction of the drive transmitting shaft 118 within a range of engagement of the detents 113b with the detents 111b of the developing input gear 111, and is engageable with the driven-side engaging member 114 mounted on the drive transmitting shaft 118. As shown in part (a) of FIG. 8, on an inside of the driving-side engaging member 113, four projected portions 113c are provided. These projected portions 113c are constituted by driving side clutch teeth projecting in a direction (engaging direction) of engaging with the driven-side engaging member 114.

Further, as shown in part (b) of FIG. 8, also the driven-side engaging member 114 is provided, as driven side clutch teeth, four projected portions which are engageable with and disengageable from the projected portions 113c and which project in a direction (engaging direction) of engaging with the driving-side engaging member 113. As a result, the driving-side engaging member 113 moves in the engaging direction, and the projected portions 113c engage with the projected portions 114c of the driven-side engaging member 113, so that a rotational driving force can be transmitted from the driving-side engaging member 113 to the driven-side engaging member 114. On the other hand, when the driving-side engaging member 113 moves in a direction (disengaging (releasing) direction) opposite to the engaging direction and the engagement between the driving-side engaging member 113 and the driven-side engaging member 114 is released (disengaged), the transmission of the driving force is released (eliminated).

Further, as shown in part (b) of FIG. 7, drive transmitting surfaces 113f, 114f of the projected portion 113c of the driving-side engaging member 113 and the projected portion 114c of the driven-side engaging member 114 are formed so as to incline and twist each other in a biting direction when these surfaces are engaged and rotated. As a result, even when the clutch CL is connected (engaged) during the rotation, the drive transmitting surfaces 113f, 114f reliably engage with each other, so that tooth skipping does not generate even when a large torque is applied to the clutch. In this embodiment, an inclination angle $\beta$ of the drive transmitting surface 113f, 114f was set at 10°. The inclination angle $\beta$ may only be required to be not less than 0°. When the inclination angle $\beta$ is excessively large, the clutch is not readily disengaged, and therefore a suitable range of the inclination angle β is about 0-20°.

When the projected portions 113c and 114c are simply twisted, the clutch can be engaged with reliability, but on the other hand, when the clutch is disengaged, a large force is exerted on tooth tops of the projected portions 113c and 114c with respect to the rotational direction and the axial direction, so that impact noise due to deformation of the tooth tops by the force generates.

Therefore, in this embodiment, at free ends of the projected portions 113c of the driving-side engaging member 113 and the projected portions 114c of the driven-side engaging member 114 with respect to the engaging direction, functional surfaces 113e and 114e (parts (a) and (b) of FIG. 8) inclining both in the rotational direction and the axial direction with respect to the drive transmitting surfaces 113f, 114f are provided, respectively. As a result, when the clutch CL is disengaged (disconnected) during the rotation, the deformation of the tooth tops by a load torque is suppressed, so that the impact noise due to this deformation can be suppressed. The functional surfaces 113e and 114e will be described later.

As shown in FIG. 1, a driven side end surface of the driving-side engaging member 113, a slidable portion 113d rotatable and slidable with a releasing member 115 which is described later. The driving-side engaging member 113 is always urged in the direction (engaging direction) toward the driven-side engaging member 114 by a coil spring 112. The developing input gear 111 and the driving-side engaging member 113 which contact both ends of the coil spring 112, respectively, are rotated together in the same direction, and therefore, a problem regarding end portion sliding of the spring and an improper operation due to a change of a winding diameter of the spring do not generate.

When the driven-side engaging member 114 is engaged with the driving-side engaging member 113, the driven-side engaging member 114 is incorporated in the driving-side engaging member 113. The driving-side engaging member 113 is capable of being incorporated in the hollow portion formed inside the developing input gear 111. Accordingly, the driving-side engaging member 113, the driven-side engaging member 114 and the coil spring 112 are incorporated in the hollow portion formed inside the developing input gear 111. As a result, not only a space can be effectively used and the clutch can be compacted, but also the driving force transmitted from the tooth surfaces is transmitted as it is to the inside, and therefore, twisting and falling forces do not readily generate in the engaging members, so that strength of component parts is easily ensured and thus a large torque can be transmitted.

The drive transmitting shaft 118 is inserted into an engaging hole 114a of the driven-side engaging member 114, and a parallel pin 119 fixed to the drive transmitting shaft 118 is engaged in a groove 114b formed in the driven-side engaging member 114. As a result, the driving force transmitted from the driving-side engaging member 113 to the driven-side engaging member 114 is transmitted to the drive transmitting shaft 118.

The drive transmitting shaft 118 is rotatably supported by the frame 120 of the driving unit via the bearing member 117 and transmits rotation (rotational force) to a developing (roller) driving portion of the process cartridge from the developing drive outputting member 121 fixed to an end portion. The bearing member 117 is fixed to the frame 120 of the driving unit and includes a rotationally slidable cylindrical portion 117b at an outer peripheral portion thereof. The bearing member 117 further includes a rotation preventing portion 117c engaging with the inner peripheral portion 115a of the releasing member 115, and thus prevents the rotation of the releasing member 115 and positions the releasing member 115 with respect to the radial direction.

A lever member 116 engaged with the cylindrical portion 117b of the bearing member 117 and rotates, and a lever portion 116a thereof is operated by a switching member 91 (part (a) of FIG. 10, part (a) of FIG. 11) described later. The lever member 116 includes a cam portion 116c, and the cam portion 116c contacts the cam portion 115c of the releasing member 115 and controls the position of the releasing member 115 with respect to the axial direction. The cam portions 115c and 116c are symmetrically provided at a plurality of positions with respect to a rotation center. As a result, it is possible prevent an improper operation and an increase of an operation resistance due to inclination of the releasing member 115.

The clutch device 115c has a shape correspondingly to the cam portion 116c of the lever member 116 and is positioned with respect to the axial direction in contact with the cam portion 116c, and at the same time, the slidable portion 115b provided opposite from the cam portion 115c contacts the driving-side engaging member 113 and determine a position of the driving-side engaging member 113 with respect to the axial direction.

That is, in a state in which crests of the cam portion 116c of the lever member 116 and the cam portion 115c of the releasing member 115 coincide with each other, the releasing member 115 is pushed out in a direction of the developing input gear 111. As a result, the slidable portion 115b contacts the slidable portion 113d of the driving-side engaging member 113 spaces the driving-side engaging member 113 from the driven-side engaging member 114 against an elastic force of the spring 112, so that a so-called state in which the clutch is disengaged is formed.

On the other hand, in a state in which crests and troughs of the cam portion 116c of the lever member 116 and the cam portion 115c of the releasing member 115 coincide with each other, the releasing member 115 moves in a direction of the driven side developing drive outputting member 121, so that the driving-side engaging member 113 is urged by the elastic force of the spring 112 and engages with the driven-side engaging member 114, with the result that the clutch is engaged and the rotation (rotational force) is transmitted.

Incidentally, the constitution of the clutch CL described above may also be changed to a constitution in which the driving side and the driven side are replaced with each other.

[Operation of Clutch]

An operation of the clutch CL will be described with reference to FIGS. 9, 10 and 11.

Parts (a) and (b) of FIG. 9 are schematic views showing a state of the clutches in a home position, in which part (a) of FIG. 9 is a front view of the switching member 91 and the lever members 116 are seen from the driven side, and part (b) of FIG. 9 is a D-D sectional view of part (a) of FIG. 9. Parts (a) and (b) of FIG. 10 are schematic views showing a state of the clutches during full-color printing, in which part (a) of FIG. 10 is a front view of the switching member 91 and the lever members 116 are seen from the driven side, and part (b) of FIG. 10 is an E-E sectional view of part (a) of FIG. 10. Parts (a) and (b) of FIG. 11 are schematic views showing a state of the clutches during monochromatic printing, in which part (a) of FIG. 11 is a front view of the switching member 91 and the lever members 116 are seen from the driven side, and part (b) of FIG. 11 is an F-F sectional view of part (a) of FIG. 11.

As shown in FIGS. 9, 10 and 11, the operation of the clutches CL for driving the developing rollers (driving members) can be carried out by moving the switching member 91 in a left-right direction by the driving force of the motor 90. Further, as shown in (b) of FIG. 9, shapes of the cam portions 116c of the lever members 116 and the cam portions 115c of the releasing members 115 are changed between those for black and those for other colors. That is, each of the cam portions 115c and 116c for black has a mountain shape having inclined surfaces on both sides of a crest of the mountain, and in the home position, the crests of the mountains contact each other, and the clutch CL (CLd) is disengaged. When the lever member is rotated in any direction from the home position, the clutch CL (CLd) is engaged. The shape of the cam portions for other colors has an inclined surface similar to that for black on one side, but has a flat portion flush with the crest on the other side. That is, the clutches for the colors other than black is disengaged in the home position, and is engaged when the lever member is rotated from the home position in a direction in which the crest and the trough of the cam portions contact each other (part (b) of FIG. 10), but remains disengaged even when the lever member is rotated in the opposite direction (part (b) of FIG. 11).

By employing this constitution, on the basis of the home position (FIG. 9), it becomes possible to simply set a full-color print state in which all of the clutches CL are engaged (connected) (FIG. 10) and a monochromatic state in which only the clutch CL for black is engaged (connected) (FIG. 11).

When the process cartridges P are mounted in the image forming apparatus main assembly 2, developing driving portions on the main assembly side are in the home position shown in FIG. 9, and the switching member 91 is accurately positioned by an unshown sensor.

A recording operation in each of full-color printing (FIG. 10) and monochromatic printing (FIG. 11) will be described.

In the case of the full-color printing, when the recording operation is started by a print signal, all of the motors 100 for driving the process cartridges P and the transfer belt driving roller 13 are rotated.

At this time, the switching member 91 is in the home position shown in FIG. 9, and all of the clutches CL are disengaged, so that all of the developing rollers 6 are not rotated.

Then, as shown in part (a) of FIG. 10, a stepping motor 90 rotates in the clockwise direction as indicated by an arrow in the figure, so that the switching member 91 is moved in a leftward direction. When the lever members 116 of all of the clutches Cl are rotated by an angle α1, as shown in part (b) of FIG. 10, all of the releasing members 115 and the driving-side engaging members 113 are moved downward in the figure and are engaged with the driven-side engaging members 114, and the clutches are connected (engaged), so that all of the developing rollers 6 are rotated and a recordable state is formed.

After an end of the recording, by performing rotation for returning the stepping motor 90 to an initial state of FIG. 9, all of the clutches CL are returned to the home position and the drive is shut off, and thus the rotation of the developing rollers 6 is stopped, and then the motors 100 and the transfer belt driving roller 13 are stopped. The rotation for returning the stepping motor 90 to the initial state may also be performed after the motors 100 and the transfer belt driving roller 13 are stopped.

In the case of the monochromatic printing, when the recording operation is started by a print signal, all of the motors 100 for driving the process cartridges P and the transfer belt driving motor are rotated. At this time, all of the clutches CL are disengaged, and therefore the developing roller 6 is not rotated.

Then, as shown in part (a) of FIG. 11, a stepping motor 90 rotates in the counterclockwise direction as indicated by an arrow in the figure, so that the switching member 91 is moved in a rightward direction. When the lever members 116 of all of the clutches Cl are rotated by an angle α2, as shown in part (b) of FIG. 11, only the clutch CLd for black is connected (engaged), and other clutches CLa to CLc remain disconnected (disengaged), and therefore, only the developing roller 6 for black is rotated and a recordable state is formed.

After an end of the recording, by performing rotation for returning the stepping motor 90 to an initial state of FIG. 9, all of the clutches CL including the clutch CLd for black are returned to the home position and the drive is shut off, and thus the rotation of the developing rollers 6 is stopped, and then the motors 100 and the transfer belt driving roller 13 are stopped. The rotation for returning the stepping motor 90 to the initial state may also be performed after the process cartridge driving motors 100 and the transfer belt driving roller 13 are stopped.

Thus, in a process of forming the image, pre-rotation for imparting uniform electric charges to the peripheral surface of the photosensitive drum 4 is carried out before the electrostatic latent image is formed by the scanner unit LB. Then, after the latent image is developed into the toner image, a process such as post-rotation is carried out for removing a potential on the peripheral surface of the photosensitive drum 4. When the pre-rotation and the post-rotation are carried out, the developing rollers 6 are stopped, and therefore, the toner is not rubbed with the developing blade 31, so that a deterioration of the toner can be prevented.

[Functional Surface]

As described above, in this embodiment, the projected portion 113c of the driving-side engaging member 113 and the projected portion 114c of the driven-side engaging member 114 have the functional surfaces 113c and 114e, respectively, and by these functional surfaces 113e and 114e, the deformation of the tooth tops during the disengagement of the clutch is suppressed, so that the impact noise can be suppressed.

A functional surface angle θ will be described with reference to FIGS. 12, 13 and 14. FIG. 12 is a helical development of the projected portion 114c of the driven-side engaging member 114. Also the projected portion 113c of the driving-side engaging member 113 has the same shape. Part (a) of FIG. 13 is a schematic view showing a state of tooth top abutment between the driving-side engaging member 113 and the driven-side engaging member 114, and part (b) of FIG. 13 is a detailed view of a portion B in part (a) of FIG. 13 and shows a dynamic model of the projected portions 113c and 114c in the tooth top abutment state. FIG. 14 is a graph showing a relationship between a load torque and the functional surface angle as an example of setting of the functional surface angle.

As shown in FIG. 12, the drive transmitting surface 114f has a twist angle (angle of torsion) β so as to bite the driving-side engaging member 113 (not shown) when the driving-side engaging member 113 engages with the driven-side engaging member 114. The functional surface 114e is positioned at a free end of the projected portion 114c with respect to a height direction, and is a surface inclined in a direction opposite from the twist angle β by θ. As described above, the twist angle β in this embodiment was set at 10°.

In this case, depending on a magnitude of the functional surface angle θ, ease of the engagement varies. That is, as regards the functional surface angle θ, when the functional surfaces 113e and 114e engage with each other, the functional surfaces 113e and 114e are inclined in an escaping direction from each other, and therefore, at a large functional surface angle θ, when the driving-side engaging member 113 and the driven-side engaging member 114 engage with each other, the functional surfaces 113e and 14e do not readily generate a biting force, so that improper engagement is liable to generate. Here, the improper engagement refers to a state in which the projected portion 113c of the driving-side engaging member 113 and the projected portion 114c of the driven-side engaging member 114 engage with each other at their free ends and cause the tooth skipping due to a load fluctuation or the like. When the tooth skipping generates during the image formation, improper rotation of the developing roller 6 generates, so that the latent image is not uniformly developed on the drum 4 with the toner and thus causes an image defect.

In order to prevent the generation of the improper engagement, the functional surface angle θ is set depending on the load torque or the like. A setting method of the functional surface angle θ for preventing the generation of the improper engagement will be described using part (b) of FIG. 13. Description thereof will be made principally based on the driving-side engaging member 113, but to the driven-side engaging member 114, only a reaction force from the driving-side engaging member 113 is added, and therefore, forces applied to these engaging members 113 and 114 are the same. Accordingly, the functional surface angles θ of the engaging members 113 and 114 may only be required to set in a similar manner.

First, referring to part (b) of FIG. 13, to the driving-side engaging member 113, in the tooth top abutment state, a pressing force Fp principally by the coil spring 112 (not shown) and a resisting force Fr principally by the load torque are applied. When Fr (resisting force)>Fp (pressing force) holds, the driving-side engaging member 113 moves so as to separate from the driven-side engaging member 114, so that the improper engagement generates. That is, in order to prevent the generation of the improper engagement, these forces Fp (pressing force) and Fr (resisting force) may only be required to be set at Fp≥Fr.

The pressing force Fp and the resisting force Fr are represented by the following formulas (1) and (2).

$$Fp = S\cos\theta + \mu N\cos\theta + \mu S\sin\theta \quad (1)$$

$$Fr = N\sin\theta \quad (2)$$

Here, S is a force (N) exerted on one tooth of the projected portion 113c by the coil spring 112, μ is a coefficient of static friction, and N is a reaction force (N) exerted on one tooth of the projected portion 113c by the load torque.

Further, when the load torque exerted on the developing roller 6 is T (Nm), an average radius of engagement of the clutch tooth is $r_m$ ($=(r_1+r_2)/2$) (m), the number of teeth of the clutch teeth is Z, and a spring force (urging force) of the coil spring 112 is f(N), the above-described forces S and N are represented by the following formulas (3) and (4).

$$S = f/Z \quad (3)$$

$$N = T/Zr_m \quad (4)$$

Further, a condition in which the improper engagement does not generate is represented by the following formula (5).

$$Fp \geq Fr \quad (5)$$

Here, when the formulas (1) to (4) are substituted into the formula (5), the functional surface angle θ satisfying the formula (5) is represented by the following formula (6).

$$\theta \leq \tan^{-1}\{(f+\rho T/r_m)/(-\mu f+T/r_m)\} \quad (6)$$

As is apparent from the formula (6), the functional surface angle θ at which the improper engagement does not generate is represented by the spring force f, the coefficient of static friction μ, the load torque T and the average radius $r_m$, and is not influenced by the number Z of the teeth of the clutch teeth. For example, this is because even when the number Z of the teeth is increased, the spring force S and the pressing force Fp which are exerted on one tooth are decreased, while the load reaction force N exerted on one tooth is also decreased, so that the influence of the number Z of the teeth is canceled.

FIG. 14 is a result of calculation, using the spring forces as a parameter, of the relationship between the functional surface angle θ and the load torque T with the use of the formula (6). FIG. 14 shows that the improper engagement does not generate when the functional surface angle θ is set at a value smaller than values of curves indicated in the figure.

As shown in FIG. 14, the functional surface angle θ is required to be decreased with an increasing load torque T. On the other hand, when the spring force f is increased, the functional surface angle θ can be increased, a degree of freedom of the functional surface angle θ increases. When an example of the functional surface angle θ is described with reference to FIG. 14, in the case where the load torque T of the developing roller 6 is 0.3 Nm, when the spring force f is set at 5N, the functional surface angle θ may only be required to be 21.4° or less. In this embodiment, the coefficient of static friction p was set at 0.3, and the average radius $r_m$ was set at 5 mm.

[Case where Clutch is Mounted in Process Cartridge]

In the above-described explanation, the clutch CL is mounted in the image forming apparatus 1, but is also mountable in the process cartridge P detachably mountable to the image forming apparatus main assembly.

FIG. 15 is a schematic view of an inside of the process cartridge P in which the clutch CL is mounted. As shown in FIG. 15, the clutch CL is disposed between the driving side process cartridge cover member 24 and a process cartridge frame 123. A constitution and an operation are the same as those in the case of FIG. 1. That is, transmission and disconnection of the driving force inputted from the image forming apparatus 1 to the developing coupling member 6a is selected by a phase of the lever member 116, and in the case where the driving force is transmitted, the driving-side engaging member 113 and the driven-side engaging member 114 engage with each other, so that the developing roller 6 is rotated. On the other hand, the driving force is disconnected (cut off), the driving-side engaging member 113 and the driven-side engaging member 114 are spaced from each other, so that the developing roller 6 is not rotated.

Further, also in the case where the clutch CL is mounted in the process cartridge P, the projected portion 113c of the driving-side engaging member 113 and the projected portion 114c of the driven-side engaging member 114 have the functional surfaces 113e and 114e, respectively, at their free ends. Thus, by providing the functional surfaces 113e and 114e, so that the impact noise during the separation (disengagement) of the clutch CL can be suppressed. Further, by setting the functional surface angle in accordance with the above-described formula (6), it becomes possible to prevent the generation of the improper engagement.

By the above-described constitution and action, it becomes possible to provide a mechanical clutch device capable of suppressing the impact noise during the disengagement of the clutch and of preventing the improper engagement during the engagement of the clutch, with a simple constitution.

Incidentally, functions, materials, relative arrangement and the like of constituent elements described in this embodiment are not intended to be limited only thereto unless otherwise specified.

By the constitution described above, it becomes possible to provide a mechanical clutch device capable of preventing the generation of the improper engagement, even when the clutch is inclined in the axial direction and is engaged, while suppressing the impact noise during the disengagement of the clutch.

Second Embodiment

Second Embodiment of the present invention will be described. In Second Embodiment, the angle of the functional surface formed at the free end of the clutch tooth is defined so as not to generate the improper engagement even in the case where the driving-side engaging member and the driven-side engaging member of the clutch are inclined with respect to the axial direction and are engaged with each other.

The inclination of the engaging members with respect to the axial direction is caused by dimensional tolerances of the shaft and the engaging members of the clutch, and is a general phenomenon of a mechanical component part such as the clutch.

Incidentally, constitutions and operations of the image forming apparatus, the process cartridge and the like are the same as those in First Embodiment. In this embodiment, only a difference from First Embodiment will be described, and detailed description as to other portions will be omitted.

Part (a) of FIG. 16 is a schematic view showing a tooth top abutment state between the driving-side engaging member 113 and the driven-side engaging member 114. Part (b) of FIG. 16 is a schematic view showing only the projected portions 113c and 114c in a C-C cross-section of part (a) of FIG. 16. Part (c) of FIG. 16 is a schematic view showing the projected portions 113c and 114c in the C-C cross-section when the driven-side engaging member 114 is inclined with respect to the axial direction.

As shown in part (b) of FIG. 16, in the case where the driving-side engaging member 113 and the driven-side engaging member 114 are not inclined with respect to the axial direction, an average radius $r_m$ calculated from an inner diameter $r_1$ and an outer diameter $r_2$ of the projected portions 113c and 114c and a contact radius $r_c$ with respect to a center of contact between the projected portions 113c and 114c coincide with each other.

On the other hand, as shown in part (c) of FIG. 16, in the case where the driving-side engaging member 113 and the driven-side engaging member 114 are inclined with respect to the axial direction and are engaged with each other, (average radius $r_m$)>(contact radius $r_c$) holds. when the average radius $r_m$ is larger than the contact radius $r_c$, the reaction force, by the load torque, substantially exerted on the projected portions 113c and 114c increases, and therefore, there is a need to decrease the functional surface angle θ in order to prevent the generation of the improper engagement. That is, on the basis of the rotation center of the drive transmitting shaft 118, with respect to the radial direction, the functional surface angle θ is decreased on the inside and is increased on the outside.

Setting of the functional surface angle θ varying depending on a position with respect to the radial direction can be made when the functional surface angle θ is calculated by substituting the contact radius $r_c$ for the average radius $r_m$ in the formula (6). For example, when the contact radius $r_c$ is 5 mm, the functional surface angle θ was 21.4° or less. Assuming that the shaft is inclined, when the contact radius $r_c$ is 4 mm, the functional surface angle θ calculated from the formula (6) is 20.5° or less and may only be required to be set at 21.4° or less at a position of the radius of 5 mm and at 20.5° or less at a position of the radius of 4 mm.

By setting so, even when the shaft is inclined and the projected portions 113c and 114c contact each other on the inside with respect to the radial direction, the improper engagement can be prevented to generate.

FIG. 17 is a perspective view of the driven-side engaging member 114 when the functional surface angle θ is changed depending on the position with respect to a radial direction, and FIG. 18 is a schematic view showing a relationship between a distance r from the shaft center and the functional surface angle θ.

In FIG. 18, the functional surface angle θ was set by a rectilinear line passing through a point of the functional surface angle θ=20° at the contact radius $r_c$=4 mm and a point of the functional surface angle θ=21° at the contact radius $r_c$=5 mm. At this time, a functional surface angle $θ_1$ is 19° at an inner diameter $r_1$ of 3 mm and a functional surface angle $θ_2$ is 23° at an outer diameter $r_2$ of 7 mm.

In this embodiment, as shown in FIG. 18, the functional surface angle θ was linearly changed depending on the position with respect to the radial direction, but may also be curvedly changed when the functional surface angle θ decreases on the inside with respect to the radial direction.

By employing the constitution as described above, even in the case where the driving-side engaging member 113 and the driven-side engaging member 114 are inclined with respect to the engaging direction and are engaged with each other, the generation of the improper engagement can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-250693 filed on Dec. 26, 2016, which is hereby incorporated by reference herein in its entirety.

What is claimed is:
1. A clutch device comprising:
a drive transmitting shaft;
a driving side engaging member provided coaxially with said drive transmitting shaft and having a driving side clutch tooth projecting in an engaging direction; and
a driven side engaging member provided on said drive transmitting shaft and having a driven side clutch tooth projecting in the engaging direction, said driven side clutch tooth being capable of being engaged with and released from said driving side clutch tooth; and an urging means configured to urge at least one of said driving side engaging member and said driven side engaging member in the engaging direction, wherein a driving force is transmitted from said driving side engaging member to said driven side engaging member by engagement therebetween, and transmission of the driving force is released by release of the engagement, wherein said driving side clutch tooth and said driven side clutch tooth have drive transmitting surfaces, the drive transmitting surfaces being inclined so as to maintain engagement with each other in the engaging direction when said driving side engaging member and said driven side engaging member are engaged, wherein at least one of said driving side clutch tooth and said driven side clutch tooth has a functional surface on a free end side relative to the drive transmitting surface with respect to the engaging direction, said functional surface being inclined so as to axially separate from a surface of the other clutch tooth in engagement therewith, and wherein the following relationship is satisfied:

$\theta \leq \tan^{-1}\{(f + \mu T/r_m)/(-\mu f + T/r_m)\}$, where θ is an inclination angle of the functional surface, f is an urging force of said urging means, μ is a coefficient of static friction, T is a load torque exerted on said drive transmitting shaft, and $r_m$ is an average radius of engagement.

2. A clutch device according to claim 1, wherein the inclination angle θ of the functional surface is larger on an outside than on an inside with respect to a radial direction extending from a rotation center of said drive transmitting shaft.

3. A clutch device according to claim 1, further comprising an input gear rotatably mounted on said drive transmitting shaft, wherein said driving side engaging member is integrally rotatable with said input gear, wherein said driven side engaging member is integrally rotatable with said drive transmitting shaft, and wherein said driving side engaging member and said driven side engaging member are capable of being incorporated in a hollow portion formed in said input gear.

4. A process cartridge detachably mountable to a main assembly of an image forming apparatus, said process cartridge comprising:

an image bearing member;

a developing device configured to develop an electrostatic latent image formed on said image bearing member; and a clutch device according to claim 1.

5. An image forming apparatus for forming an image on a recording material, comprising:

an image forming portion configured to form an image; and a clutch device according to claim 1 configured to transmit or shut off power to said image forming portion.

* * * * *